United States Patent
Kadowaki et al.

(10) Patent No.: US 12,512,470 B2
(45) Date of Patent: Dec. 30, 2025

(54) MIXED POWDER FOR ALL-SOLID-STATE LITHIUM-ION BATTERIES, MIXED PASTE FOR ALL-SOLID-STATE LITHIUM-ION BATTERIES, ELECTRODE AND ALL-SOLID-STATE LITHIUM-ION BATTERY

(71) Applicant: SUMITOMO CHEMICAL COMPANY, LIMITED, Tokyo (JP)

(72) Inventors: Takuya Kadowaki, Niihama (JP); Jun-ichi Kageura, Niihama (JP); Chikara Murakami, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 725 days.

(21) Appl. No.: 17/792,371

(22) PCT Filed: Jan. 15, 2021

(86) PCT No.: PCT/JP2021/001258
§ 371 (c)(1),
(2) Date: Jul. 12, 2022

(87) PCT Pub. No.: WO2021/145431
PCT Pub. Date: Jul. 22, 2021

(65) Prior Publication Data
US 2023/0048124 A1    Feb. 16, 2023

(30) Foreign Application Priority Data
Jan. 17, 2020    (JP) .................................. 2020-006336

(51) Int. Cl.
*H01M 4/525*    (2010.01)
*H01M 4/505*    (2010.01)
(Continued)

(52) U.S. Cl.
CPC .......... *H01M 4/525* (2013.01); *H01M 4/505* (2013.01); *H01M 10/0525* (2013.01);
(Continued)

(58) Field of Classification Search
CPC .......... Y02E 60/10; H01M 2300/0071; H01M 2004/028; H01M 2004/021;
(Continued)

(56) References Cited

U.S. PATENT DOCUMENTS

2010/0273054 A1* 10/2010 Cotton .................. H01M 4/525
429/223
2014/0065513 A1* 3/2014 Badding ............. H01M 10/056
429/492
(Continued)

FOREIGN PATENT DOCUMENTS

CN    105917500 A    8/2016
EP    3 905 394 A1    11/2021
(Continued)

OTHER PUBLICATIONS

"Matsuzaki et al., JP-2009211950-A—Translated, Sep. 17, 2009" (Year: 2009).*
(Continued)

*Primary Examiner* — Milton I Cano
*Assistant Examiner* — Jesse J Efymow
(74) *Attorney, Agent, or Firm* — Rimon P.C.

(57) ABSTRACT

A mixed powder for an all-solid-state lithium-ion battery, which is composed of a positive electrode active material for a lithium-ion battery and a solid electrolyte, wherein the positive electrode active material for a lithium-ion battery is composed of particles containing crystals of a lithium metal composite oxide, and the lithium metal composite oxide has a layered structure and contains at least Li and a transition metal, wherein the positive electrode active material for a
(Continued)

lithium-ion battery has a particle diameter distribution that satisfies the following Formula (1), and wherein the solid electrolyte has a particle diameter distribution that satisfies the following Formula (2):

$$(D90-D10)/D50 \leq 1.5 \quad (1)$$

$$(D90-D10)/D50 \leq 2.0 \quad (2).$$

21 Claims, 2 Drawing Sheets

(51) Int. Cl.
   *H01M 10/0525* (2010.01)
   *H01M 10/0562* (2010.01)
   *H01M 4/02* (2006.01)

(52) U.S. Cl.
   CPC .. *H01M 10/0562* (2013.01); *H01M 2004/021* (2013.01); *H01M 2004/028* (2013.01); *H01M 2300/0071* (2013.01)

(58) Field of Classification Search
   CPC ......... H01M 10/0562; H01M 10/0525; H01M 10/052; H01M 4/62; H01M 4/525; H01M 4/505; H01M 4/366; H01M 4/1391; H01M 4/131; C01P 2004/61; C01P 2004/51; C01G 53/82; C01G 53/50; C01G 53/00; C01B 35/128; C01B 35/12
   See application file for complete search history.

(56) References Cited

U.S. PATENT DOCUMENTS

| | | | |
|---|---|---|---|
| 2014/0295260 A1 | 10/2014 | Sugiura et al. | |
| 2016/0020486 A1* | 1/2016 | Lee | H01M 10/052 429/305 |
| 2016/0204467 A1 | 7/2016 | Nogami et al. | |
| 2016/0380263 A1 | 12/2016 | Nakayama et al. | |
| 2017/0187031 A1* | 6/2017 | Kurita | H01M 10/0525 |
| 2017/0288222 A1* | 10/2017 | Kobayashi | C01G 53/40 |
| 2019/0074543 A1* | 3/2019 | Houjyou | H01M 10/0585 |
| 2019/0198919 A1* | 6/2019 | Makino | H01M 4/1393 |
| 2020/0185761 A1 | 6/2020 | Sakawaki et al. | |
| 2020/0313183 A1* | 10/2020 | Kadowaki | H01M 4/366 |
| 2021/0013508 A1 | 1/2021 | Kuroda | |
| 2021/0043918 A1 | 2/2021 | Maeyama et al. | |

FOREIGN PATENT DOCUMENTS

| | | | |
|---|---|---|---|
| IN | 201714006921 A | | 3/2018 |
| JP | 2009-110920 A | | 5/2009 |
| JP | 2009211950 A | * | 9/2009 |
| JP | 2012-134133 A | | 7/2012 |
| JP | 2015-076154 A | | 4/2015 |
| JP | 2018-014317 A | | 1/2018 |
| JP | 2019-040674 A | | 3/2019 |
| JP | 2019-160571 A | | 9/2019 |
| JP | 2019-220468 A | | 12/2019 |
| KR | 101933130 B1 | | 12/2018 |
| WO | 2013/073035 A1 | | 5/2013 |
| WO | 2013/076854 A1 | | 5/2013 |
| WO | 2015/030052 A1 | | 3/2015 |
| WO | 2015/111740 A1 | | 7/2015 |
| WO | 2019/150559 A1 | | 8/2019 |
| WO | 2019/177014 A1 | | 9/2019 |
| WO | 2020/136975 A1 | | 7/2020 |

OTHER PUBLICATIONS

"Eom at el., KR 2019-0056139 A—Machine Translated, May 24, 2019" (Year: 2019).*

International Search Report issued in corresponding International Patent Application No. PCT/JP2021/001258, dated Mar. 30, 2021, with English translation.

Japanese Notice of Reasons for Refusal issued in corresponding Japanese Patent Application No. 2020-006336, dated Jun. 16, 2020, with English translation.

* cited by examiner

MIXED POWDER FOR ALL-SOLID-STATE LITHIUM-ION BATTERIES, MIXED PASTE FOR ALL-SOLID-STATE LITHIUM-ION BATTERIES, ELECTRODE AND ALL-SOLID-STATE LITHIUM-ION BATTERY

CROSS REFERENCE TO RELATED APPLICATIONS

This application is the U.S. National Phase under 35 U.S.C. § 371 of International Application No. PCT/JP2021/001258, filed on Jan. 15, 2021, which claims the benefit of Japanese Application No. 2020-006336, filed on Jan. 17, 2020, the entire contents of each are hereby incorporated by reference.

TECHNICAL FIELD

The present invention relates to a mixed powder for an all-solid-state lithium-ion battery, a mixed paste for an all-solid-state lithium-ion battery, an electrode and an all-solid-state lithium-ion battery.

BACKGROUND ART

Research on lithium-ion secondary batteries is active for applications such as drive power supplies of electric vehicles and household storage batteries. Among these, the all-solid-state lithium-ion secondary battery has advantages such as a high energy density, a wide operation temperature range, and resistance to deterioration, as compared with a conventional lithium-ion secondary battery using an electrolytic solution. Therefore, the all-solid-state lithium-ion secondary battery is being focused on as a next-generation energy storage device.

In the following description, the "conventional lithium-ion secondary battery using an electrolytic solution" may be referred to as a "liquid-based lithium-ion secondary battery" in order to distinguish it from an all-solid-state lithium-ion secondary battery.

Patent Document 1 describes an all-solid-state lithium-ion secondary battery using $LiNi_{1/3}Mn_{1/3}Co_{1/3}O_2$ as a positive electrode active material. $LiN_{1/3}Mn_{1/3}Co_{1/3}O_2$ is a well-known material as a positive electrode active material for a liquid-based lithium-ion secondary battery.

CITATION LIST

Patent Literature

[Patent Document 1]
  JP-A-2018-014317

SUMMARY OF INVENTION

Technical Problem

In a positive electrode of an all-solid-state lithium-ion secondary battery, lithium-ions are exchanged between a positive electrode active material and a solid electrolyte. In the study of all-solid-state lithium-ion secondary batteries, there has been a demand for a positive electrode active material that can smoothly exchange the above lithium-ions and can improve battery performance such as initial charging and discharging efficiency.

In addition, in the study of all-solid-state lithium-ion secondary batteries, the findings of studies on conventional liquid-based lithium-ion secondary batteries may not be utilized. Therefore, there is a need for specific studies on all-solid-state lithium-ion secondary batteries.

The present invention has been made in view of such circumstances, and an object of the present invention is to provide a mixed powder for an all-solid-state lithium-ion battery that can improve the initial charging and discharging efficiency. In addition, another object of the present invention is to provide a mixed paste for an all-solid-state lithium-ion battery containing such a mixed powder for an all-solid-state lithium-ion battery, an electrode and an all-solid-state lithium-ion battery.

Here, the "initial charging and discharging efficiency" is a capacity ratio with the initial charging capacity as the denominator and the initial discharging capacity as the numerator. An all-solid-state lithium-ion battery having high initial charging and discharging efficiency has a small irreversible capacity during initial charging and during discharging and tends to have a relatively large volume and capacity per weight.

Solution to Problem

In order to address the above problems, the present invention includes the following aspects.

[1] A mixed powder for an all-solid-state lithium-ion battery, which is composed of a positive electrode active material for a lithium-ion battery and a solid electrolyte,
  wherein the positive electrode active material for a lithium-ion battery is composed of particles containing crystals of a lithium metal composite oxide, and the lithium metal composite oxide has a layered structure and contains at least Li and a transition metal,
  wherein the positive electrode active material for a lithium-ion battery has a particle diameter distribution that satisfies the following Formula (1), and
  wherein the solid electrolyte has a particle diameter distribution that satisfies the following Formula (2):

$$(D90-D10)/D50 \leq 1.5 \qquad (1)$$

$$(D90-D10)/D50 \leq 2.0 \qquad (2)$$

(in Formulae (1) and (2), D10, D50 and D90 are values obtained by the following method,
  first, the mixed powder is observed under a scanning electron microscope (SEM) to obtain an SEM image at a magnification of 2,000,
  from the obtained SEM image, according to analysis of element components contained through SEM-EDX, positive electrode active material particles for a lithium-ion battery and solid electrolyte particles are identified.
  for the identified positive electrode active material particles for a lithium-ion battery, 100 positive electrode active material particles for a lithium-ion battery, which exist in isolation from other particles are selected,
  for the identified solid electrolyte particles, 100 solid electrolyte particles that exist in isolation from other particles are selected,
  next, using image analysis software, the particle areas of the selected positive electrode active material particles for a lithium-ion battery or solid electrolyte particles are measured,
  next, the diameters of the circles from which the particle areas have been obtained are determined, the obtained diameters being used as the particle diameters of the positive electrode active material particles for a lithium-ion battery or the solid electrolyte particles, next, the 100 selected positive electrode active material particles for a lithium-ion battery or solid electrolyte particles are arranged in ascending order of the particle diameter, and next, the particle diameter of the 10th particle from the smallest particle diameter is set as D10 (unit: μm) of the positive electrode active material particles for a lithium-ion battery or the solid electrolyte particles, the particle diameter of the 50th particle from the smallest particle diameter is set as D50 (unit: μm) of the positive electrode active material particles for a lithium-ion battery or the solid electrolyte particles, and the particle diameter of the 90th particle from the smallest particle diameter is set as D90 (unit: μm) of the positive electrode active material particles for a lithium-ion battery or the solid electrolyte particles).

[2] The mixed powder for an all-solid-state lithium-ion battery according to [1], wherein the solid electrolyte is an oxide-based solid electrolyte.

[3] The mixed powder for an all-solid-state lithium-ion battery according to [1] or [2], wherein the volume ratio between the positive electrode active material for a lithium-ion battery and the solid electrolyte is 50:50 to 95:5, and wherein a ratio between D50 of the positive electrode active material for a lithium-ion battery and D50 of the solid electrolyte ((D50 of positive electrode active material for a lithium-ion battery)/(D50 of solid electrolyte)) is 0.1 or more and 10 or less.

[4] The mixed powder for an all-solid-state lithium-ion battery according to any one of [1] to [3],
wherein the solid electrolyte has a D50 of 10 μm or less and a D90 of 15 μm or less.

[5] The mixed powder for an all-solid-state lithium-ion battery according to any one of [1] to [4], wherein the solid electrolyte is a garnet-type oxide solid electrolyte.

[6] The mixed powder for an all-solid-state lithium-ion battery according to any one of [1] to [5], wherein the solid electrolyte is an oxide-based solid electrolyte having a melting point of 900° C. or lower.

[7] The mixed powder for an all-solid-state lithium-ion battery according to any one of [1] to [6],
wherein the transition metal is at least one element selected from the group consisting of Ni, Co, Mn, Ti, Fe, V and W.

[8] The mixed powder for an all-solid-state lithium-ion battery according to [7],
wherein the lithium metal composite oxide is represented by the following Formula (A):

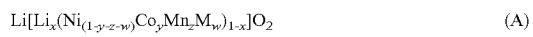

$$Li[Li_x(Ni_{(1-y-z-w)}Co_yMn_zM_w)_{1-x}]O_2 \quad (A)$$

(where, M is at least one element selected from the group consisting of Fe, Cu, Ti, Mg, Al, W, B, Mo, Nb, Zn, Sn, Zr, Ga and V, and −0.10≤x≤0.30, 0≤y≤0.40, 0≤z≤0.40, 0≤w≤0.10, and 0<y+z+w are satisfied).

[9] The mixed powder for an all-solid-state lithium-ion battery according to [8],
wherein, in Formula (A), 1−y−z−w≥0.50 and y≤0.30 are satisfied.

[10] The mixed powder for an all-solid-state lithium-ion battery according to any one of [1] to [9],
wherein the particles are composed of primary particles, secondary particles which are aggregates of the primary particles, and single particles that exist independently of the primary particles and the secondary particles, and wherein the amount of the single particles in the particles is 20% or more.

[11] A mixed paste for an all-solid-state lithium-ion battery including the mixed powder according to any one of [11] to [10] and an organic binder at a mass ratio of 10:90 to 90:10.

[12] An electrode including the mixed powder for an all-solid-state lithium-ion battery according to any one of [1] to [10].

[13] An electrode including the mixed paste for an all-solid-state lithium-ion battery according to [11].

[14] The electrode according to [12] or [13], further including a solid electrolyte.

[15] An all-solid-state lithium-ion battery including a positive electrode, a negative electrode, and a solid electrolyte layer interposed between the positive electrode and the negative electrode,
wherein the solid electrolyte layer contains a first solid electrolyte,
wherein the positive electrode has a positive electrode active material layer in contact with the solid electrolyte layer and a current collector on which the positive electrode active material layer is laminated, and
wherein the positive electrode active material layer contains the mixed powder for an all-solid-state lithium-ion battery according to any one of [1] to [10].

[16] The all-solid-state lithium-ion battery according to [15],
wherein the positive electrode active material layer contains the mixed powder for an all-solid-state lithium-ion battery and a second solid electrolyte.

[17] The all-solid-state lithium-ion battery according to [16],
wherein the first solid electrolyte and the second solid electrolyte are the same substance.

[18] The all-solid-state lithium-ion battery according to any one of [15] to [17],
wherein the first solid electrolyte has an amorphous structure.

[19] The all-solid-state lithium-ion battery according to any one of [15] to [18],
wherein the first solid electrolyte is an oxide-based solid electrolyte.

Advantageous Effects of Invention

According to the present invention, it is possible to provide a mixed powder for an all-solid-state lithium-ion battery that can smoothly exchange lithium-ions with a solid electrolyte in a positive electrode and can improve initial charging and discharging efficiency. In addition, it is possible to provide a mixed paste for an all-solid-state lithium-ion battery containing such a mixed powder for an all-solid-state lithium-ion battery, an electrode and an all-solid-state lithium-ion battery.

DESCRIPTION OF EMBODIMENTS

<Mixed Powder for all-Solid-State Lithium-Ion Battery>

Figure 1:
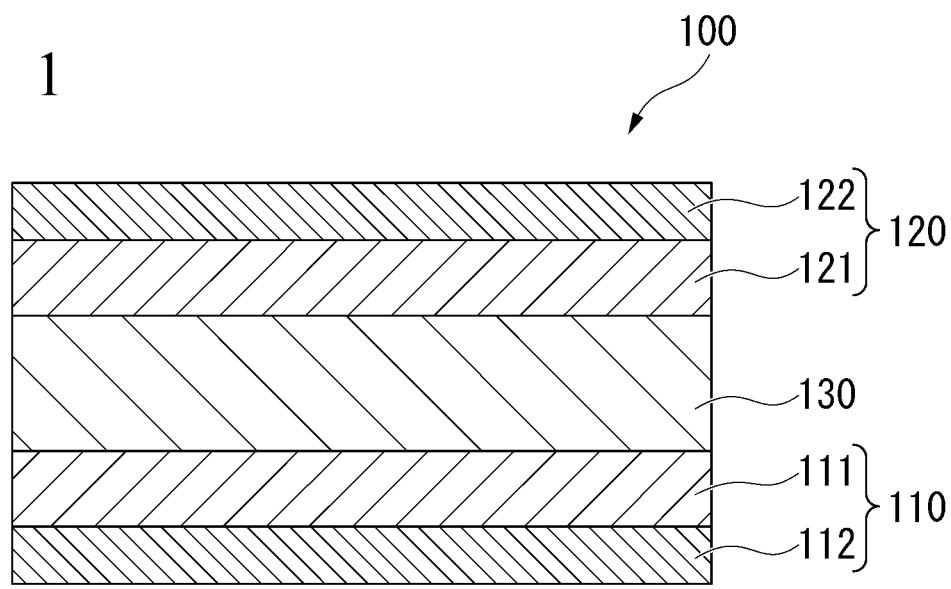
FIG. 1 is a schematic view showing a laminate included in an all-solid-state lithium-ion battery of an embodiment.

A mixed powder for an all-solid-state lithium-ion battery of the present embodiment is a mixed powder composed of a positive electrode active material for a lithium-ion battery and a solid electrolyte. Hereinafter, the "mixed powder for an all-solid-state lithium-ion battery" of the present embodiment may be abbreviated as "mixed powder." The positive electrode active material for a lithium-ion battery may be simply referred to as a "positive electrode active material."

<Measurement of D10, D50 and D90 in Particle Diameter Distribution of Positive Electrode Active Material or Solid Electrolyte>

D10, D50 and D90 in the particle diameter distribution of the positive electrode active material or the solid electrolyte are values obtained by the following method.

First, the mixed powder is observed under a scanning electron microscope (SEM) to obtain an SEM image at a magnification of 2,000.

From the obtained SEM image, according to analysis of element components contained through SEM-EDX, positive electrode active material particles for a lithium-ion battery (hereinafter referred to as "positive electrode active material particles") and solid electrolyte particles are identified.

For the identified positive electrode active material particles, 100 positive electrode active material particles that exist in isolation from other particles are selected. The positive electrode active material particles selected in this case may be any of primary particles, secondary particles, and single particles.

For the identified solid electrolyte particles, 100 solid electrolyte particles that exist in isolation from other particles are selected.

Here, if the number of isolated particles is less than 100, wanting particles are obtained from another SEM image (magnification of 2000).

Next, using image analysis software, the particle areas of the selected positive electrode active material particles or solid electrolyte particles are measured.

Next, the diameters of the circles from which the particle areas have been obtained are determined. Specifically, the diameter d of the circle is calculated by the following formula.

$$d = 2 \times (S/\pi)^{1/2}$$

(in the formula, S is a particle area).

The obtained diameter is used as the particle diameter of the positive electrode active material particles or the solid electrolyte particles.

Next, the 100 selected positive electrode active material particles or solid electrolyte particles are arranged in ascending order of the particle diameter.

Examples of a method of sorting the sizes of the particle diameter include a method of arranging CSV data analyzed by image analysis software in order of size using spreadsheet software such as Excel.

Next, the particle diameter of the $10^{th}$ particle from the smallest particle diameter is set as D10 (unit: μm) of the positive electrode active material particles or the solid electrolyte particles, the particle diameter of the $50^{th}$ particle from the smallest particle diameter is set as the D50 (unit: μm) of the positive electrode active material particles or the solid electrolyte particles, and the particle diameter of the $90^{th}$ particle from the smallest particle diameter is set as D90 (unit: μm) of the positive electrode active material particles or the solid electrolyte particles.

The positive electrode active material containing the mixed powder is composed of particles containing crystals of a lithium metal composite oxide. The lithium metal composite oxide has a layered structure and contains at least Li and a transition metal.

The positive electrode active material containing the mixed powder has a particle diameter distribution that satisfies the following Formula (1).

$$(D90-D10)/D50 \leq 1.5 \qquad (1)$$

(in Formula (1), D10, D50 and D90 are values obtained by the above method).

The upper limit of (D90−D10)/D50 is preferably 1.4 or less, more preferably 1.3 or less, and particularly preferably 1.2 or less.

Examples of lower limits of (D90-D10)/D50 include 0.1 or more, 0.2 or more, and 0.3 or more.

These upper limits and lower limits can be arbitrarily combined.

Examples of combinations include a (D90-D10)/D50 of 0.1 or more and 1.4 or less, 0.2 or more and 1.3 or less, and 0.3 or more and 1.2 or less.

In order to set the particle diameter distribution to be within a desired range, the positive electrode active material may be a mixture of two or more types of lithium metal composite oxides having different particle diameters.

The solid electrolyte containing the mixed powder has a particle diameter distribution that satisfies the following Formula (2).

$$(D90-D10)/D50 \leq 2.0 \qquad (2)$$

(in Formula (2), D10, D50 and D90 are values obtained by the above method).

The upper limit of (D90−D10)/D50 is preferably 1.9 or less, more preferably 1.8 or less, and particularly preferably 1.7 or less.

Examples of lower limits of (D90−D10)/D50 include 0.1 or more, 0.2 or more, and 0.3 or more.

These upper limits and lower limits can be arbitrarily combined.

Examples of combinations include a (D90−D10)/D50 of 0.1 or more and 1.9 or less, 0.2 or more and 1.8 or less, and 0.3 or more and 1.7 or less.

The mixed powder can be suitably used for an all-solid-state lithium-ion battery containing an oxide-based solid electrolyte.

In the mixed powder, the volume ratio between the positive electrode active material and the solid electrolyte is preferably 50:50 to 95:5, more preferably 55:45 to 90:10, and particularly preferably 60:40 to 85:15.

When the volume ratio of the mixed powder is within the above range, if a positive electrode active material layer containing a solid electrolyte or a positive electrode active material film containing a solid electrolyte is produced, the contact area between the positive electrode active material and the solid electrolyte can increase, and the initial charging and discharging efficiency can be improved.

In the mixed powder, the ratio between D50 of the positive electrode active material and D50 of the solid electrolyte ((positive electrode active material D50)/(solid electrolyte D50)) is preferably 0.1 or more and 10 or less, more preferably 0.5 or more and 10 or less, and particularly preferably 1 or more and 10 or less.

When the ratio ((positive electrode active material D50)/(solid electrolyte D50)) is within the above range, the positive electrode active material and the solid electrolyte are likely to be uniformly mixed in the mixed powder. When such a mixed powder is used, it is possible to uniformly diffuse lithium-ions, it is possible to smoothly exchange lithium-ions with the solid electrolyte in the positive electrode, and it is possible to improve initial charging and discharging efficiency.

<Analysis Method of a Mixed Powder>

Whether the mixed powder satisfies having the above volume ratio and ratio ((positive electrode active material D50)/(solid electrolyte D50)) can be confirmed by the following method.

First, the mixed powder is observed under a scanning electron microscope (SEM) to obtain an SEM image at a magnification of 2,000.

From the obtained SEM image, according to analysis of element components contained through SEM-EDX, positive electrode active material particles and solid electrolyte particles are identified.

Specifically, for example, among elements that can be detected through SEM-EDX, particles having a amount of 50 mol % or more of a first transition metal element such as Ni, Mn, or Co are determined as positive electrode active material particles.

In addition, particles which contain a large amount of La, Zr, B, S, P, Ga and the like and are not the positive electrode active material particles are determined as solid electrolyte particles.

For the identified positive electrode active material particles, 100 positive electrode active material particle that exist in isolation from other particles are selected in the field of view of the SEM 2D image.

For the identified solid electrolyte particles, 100 solid electrolyte particles that exist in isolation from other particles are selected in the field of view of the SEM 2D image. Here, if the number of isolated particles is less than 100, wanting particles are obtained from another SEM image (magnification of 2,000).

S1 which indicates a total area of the 100 selected positive electrode active material particles is calculated. The value obtained by multiplying S1 by 3/2 is set as T1 which indicates the volume of the positive electrode active material particles.

S2 which indicates a total area of the 100 selected solid electrolyte particles is calculated. The value obtained by multiplying S2 by 3/2 is set as T2 which indicates the volume of the solid electrolyte.

The ratio (T1/T2) of T1 to T2 is defined as a volume ratio between the positive electrode active material and the solid electrolyte.

The ratio ((D50 of positive electrode active material)/(D50 of solid electrolyte)) is calculated as follows.

First, D50 of the positive electrode active material and D50 of the solid electrolyte are obtained by the method described in the above <Measurement of D10, D50 and D90 in particle diameter distribution of positive electrode active material or solid electrolyte>. Next, the ratio ((D50 of positive electrode active material)/(D50 of solid electrolyte)) is calculated.

In addition, as a method of measuring the above volume ratio and ratio ((D50 of positive electrode active material)/(D50 of solid electrolyte)) of the mixed powder from the electrode, the cross section of the electrode can be confirmed by FIB-SEM, and thus the above volume ratio and ratio ((D50 of positive electrode active material)/(D50 of solid electrolyte)) can be calculated according to the same analysis as above.

<<Positive Electrode Active Material for Lithium-Ion Battery>>

The positive electrode active material is composed of particles containing crystals of a lithium metal composite oxide.

The requirements will be described below in order.

(Requirement 1: Lithium Metal Composite Oxide)

The lithium metal composite oxide contains Li and a transition metal, and preferably contains at least one element selected from the group consisting of Ni, Co, Mn, Ti, Fe, V and W as a transition metal. Here, in this specification, the transition metal refers to a transition metal element.

When the lithium metal composite oxide contains at least one selected from the group consisting of Ni, Co and Mn as a transition metal, the obtained lithium metal composite oxide forms a stable crystal structure in which Li ions can be desorbed or inserted. Therefore, when the positive electrode active material is used for a positive electrode of an all-solid-state lithium-ion battery, a high charging capacity and a high discharging capacity can be obtained.

In addition, when the lithium metal composite oxide contains at least one selected from the group consisting of Ti, Fe, V and W, the obtained lithium metal composite oxide has a strong crystal structure. Therefore, the positive electrode active material has high thermal stability. In addition, the all-solid-state lithium-ion battery using the positive electrode active material of the present embodiment has improved cycle characteristics.

More specifically, the lithium metal composite oxide is represented by the following Composition Formula (A).

$$\text{Li}[\text{Li}_x(\text{Ni}_{(1-y-z-w)}\text{Co}_y\text{Mn}_z\text{M}_w)_{1-x}]\text{O}_2 \quad (A)$$
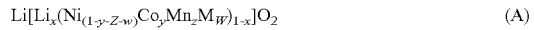

(where, M is at least one element selected from the group consisting of Fe, Cu, Ti, Mg, Al, W, B, Mo, Nb, Zn, Sn, Zr, Ga, La and V, and $-0.1 \leq x \leq 0.30$, $0 \leq y \leq 0.40$, $0 \leq z \leq 0.40$, $0 \leq w \leq 0.10$, and $0 < y+z+w$ are satisfied).

(Regarding x)

In order to obtain an all-solid-state lithium-ion battery having a favorable cycle characteristic, x is preferably more than 0, more preferably 0.01 or more, and still more preferably 0.02 or more. In addition, in order to obtain an all-solid-state lithium-ion battery having a high initial Coulomb efficiency, x is preferably 0.25 or less, and more preferably 0.10 or less.

Here, in this specification, a "favorable cycle characteristic" means a characteristic in which the amount by which a battery capacity decreases due to repeated charging and discharging is small, and means that the ratio of the capacity during re-measurement to the initial capacity is unlikely to decrease.

In addition, in this specification, the "initial Coulomb efficiency" is a value obtained by "(initial discharging capacity)/(initial charging capacity)×100(%)." A secondary battery having a high initial Coulomb efficiency has a small irreversible capacity during initial charging and during discharging and tends to have a relatively large volume and capacity per weight.

The upper limit values and the lower limit values of x can be arbitrarily combined. x may be −0.10 or more and 0.25 or less, and may be −0.10 or more and 0.10 or less.

x may be more than 0 and 0.30 or less, may be more than 0 and 0.25 or less, and more than 0 and 0.10 or less.

x may be 0.01 or more and 0.30 or less, may be 0.01 or more and 0.25 or less, and may be 0.01 or more and 0.10 or less.

x may be 0.02 or more and 0.3 or less, may be 0.02 or more and 0.25 or less, and may be 0.02 or more and 0.10 or less.

It is preferable that x satisfy $0<x\leq0.30$.

(Regarding y)

In order to obtain an all-solid-state lithium-ion battery having a low battery internal resistance, y is preferably more than 0, more preferably 0.005 or more, still more preferably 0.01 or more, and particularly preferably 0.05 or more. In addition, in order to obtain an all-solid-state lithium-ion battery having high thermal stability, y is more preferably 0.35 or less, still more preferably 0.33 or less, and yet more preferably 0.30 or less.

The upper limit values and the lower limit values of y can be arbitrarily combined. y may be 0 or more and 0.35 or less, may be 0 or more and 0.33 or less, and may be 0 or more and 0.30 or less.

y may be more than 0 and 0.40 or less, may be more than 0 and 0.35 or less, may be more than 0 and 0.33 or less, and may be more than 0 and 0.30 or less.

y may be 0.005 or more and 0.40 or less, may be 0.005 or more and 0.35 or less, may be 0.005 or more and 0.33 or less, and may be 0.005 or more and 0.30 or less.

y may be 0.01 or more and 0.40 or less, may be 0.01 or more and 0.35 or less, may be 0.01 or more and 0.33 or less, and may be 0.01 or more and 0.30 or less.

y may be 0.05 or more and 0.40 or less, may be 0.05 or more and 0.35 or less, may be 0.05 or more and 0.33 or less, and may be 0.05 or more and 0.30 or less.

It is preferable that y satisfy $0<y\leq0.40$.

In Composition Formula (A), $0<x\leq0.10$, and $0<y\leq0.40$ are more preferable.

(Regarding z)

In order to obtain an all-solid-state lithium-ion battery having excellent cycle characteristics, z is preferably more than 0, z is more preferably 0.01 or more, still more preferably 0.02 or more, and yet more preferably 0.1 or more. In addition, in order to obtain an all-solid-state lithium-ion battery having high storability at a high temperature (for example, in an environment at 60° C.), z is preferably 0.39 or less, more preferably 0.38 or less, and still more preferably 0.35 or less.

The upper limit values and the lower limit values of z can be arbitrarily combined. z may be 0 or more and 0.39 or less, may be 0 or more and 0.38 or less, and may be 0 or more and 0.35 or less.

z may be 0.01 or more and 0.40 or less, may be 0.01 or more and 0.39 or less, may be 0.01 or more and 0.38 or less, and may be 0.01 or more and 0.35 or less.

z may be 0.02 or more and 0.40 or less, may be 0.02 or more and 0.39 or less, may be 0.02 or more and 0.38 or less, and may be 0.02 or more and 0.35 or less.

z may be 0.10 or more and 0.40 or less, may be 0.10 or more and 0.39 or less, may be 0.10 or more and 0.38 or less, and may be 0.10 or more and 0.35 or less.

z is preferably $0.02\leq z\leq0.35$.

(Regarding w)

In order to obtain an all-solid-state lithium-ion battery having a low battery internal resistance, w is preferably more than 0, more preferably 0.0005 or more, and still more preferably 0.001 or more. In addition, in order to obtain an all-solid-state lithium-ion battery having a large discharging capacity at a high current rate, w is preferably 0.09 or less, more preferably 0.08 or less, and still more preferably 0.07 or less.

The upper limit values and the lower limit values of w can be arbitrarily combined. w may be 0 or more and 0.09 or less, may be 0 or more and 0.08 or less, and may be 0 or more and 0.07 or less.

w may be more than 0 and 0.10 or less, may be more than 0 and 0.09 or less, may be more than 0 and 0.08 or less, and may be more than 0 and 0.07 or less.

w may be 0.0005 or more and 0.10 or less, may be 0.0005 or more and 0.09 or less, may be 0.0005 or more and 0.08 or less, and may be 0.0005 or more and 0.07 or less.

w may be 0.001 or more and 0.10 or less, may be 0.001 or more and 0.09 or less, may be 0.001 or more and 0.08 or less, and may be 0.001 or more and 0.07 or less.

It is preferable that w satisfy $0\leq w\leq0.07$.

(Regarding y+z+w) In order to obtain an all-solid-state lithium-ion battery having a large battery capacity, y+z+w is preferably 0.50 or less, more preferably 0.48 or less, and still more preferably 0.46 or less.

y+z+w is more than 0, preferably 0.001 or more, and more preferably 0.002 or more.

y+z+w is preferably more than 0 and 0.50 or less.

The lithium metal composite oxide contained in the positive electrode active material preferably satisfies $1-y-z-\geq0.50$ and $y\leq0.30$ in Composition Formula (A). That is, the lithium metal composite oxide contained in the positive electrode active material preferably has a Ni content molar ratio of 0.50 or more and a Co content molar ratio of 0.30 or less in Composition Formula (A).

(Regarding M)

In Composition Formula (A), M represents at least one element selected from the group consisting of Fe, Cu, Ti, Mg, Al, W, B, Mo, Nb, Zn, Sn, Zr, Ga, La and V.

In addition, in order to obtain an all-solid-state lithium-ion battery having excellent cycle characteristic, M is preferably at least one element selected from the group consisting of Ti, Mg, Al, W, B, and Zr, and more preferably at least one element selected from the group consisting of Al and Zr. In addition, in order to obtain an all-solid-state lithium-ion battery having high thermal stability. M is preferably at least one element selected from the group consisting of Ti, Al, W, B, and Zr.

As an example of a preferable combination of the above x, y, z, and w, x is 0.02 or more and 0.30 or less, y is 0.05 or more and 0.30 or less, z is 0.02 or more and 0.35 or less, and w is 0 or more and 0.07 or less. For example, a lithium metal composite oxide with x=0.05, y=0.20, z=0.30, and w=0, a lithium metal composite oxide with x=0.05, y=0.08, z=0.04, and w=0, and a lithium metal composite oxide with x=0.25, y=0.07, z=0.02, and w=0 is an exemplary example.

<Composition Analysis>

The composition of the lithium metal composite oxide can be confirmed by dissolving particles of the positive electrode active material containing lithium metal composite oxides in hydrochloric acid and then performing composition analysis using an inductively coupled plasma emission analysis device. The analysis results of the Li and transition metal of the positive electrode active material can be regarded as the results of composition analysis of the lithium metal composite oxide. As the inductively coupled plasma emission analysis device, for example, an SPS3000 (commercially available from SII NanoTechnology Inc.) can be used.

(Layered Structure)

The crystal structure of the lithium metal composite oxide is a layered structure. The crystal structure of the lithium metal composite oxide is more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6mm, P6cc, $P6_3$cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, in order to obtain a lithium secondary battery having a high discharging capacity, the crystal structure is particularly preferably a hexagonal crystal structure belonging to the space group R-3m or a monoclinic crystal structure belonging to C2/m.

<Method of Confirming Layered Structure>

The crystal structure can be confirmed by observing the positive electrode active material using a powder X-ray diffraction measuring device. When the positive electrode active material has a coating layer, the structure can be confirmed by observing a substance obtained by removing the coating layer by a well-known method by the above method.

For powder x-ray diffraction measurement, an X-ray diffraction device, for example, Ultima IV (commercially available from Rigaku Corporation), can be used.

<<Solid electrolyte>>

In the particle diameter distribution of the solid electrolyte, the D50 calculated by the above method is preferably 10 μm or less, more preferably 9.9 μm or less, and still more preferably 9.8 μm or less.

Examples of lower limits of D50 include 0.1 μm or more, 0.2 μm or more, and 0.3 μm or more.

These upper limits and lower limits of D50 can be arbitrarily combined.

Examples of combinations include a D50 of 0.1 μm or more and 10 μm or less, 0.2 μm or more and 9.9 μm or less, and 0.3 μm or more and 9.8 μm or less.

In the particle diameter distribution of the solid electrolyte, the D90 calculated by the above method is preferably 15 μm or less, more preferably 14.5 μm or less, and still more preferably 14.0 μm or less.

Examples of lower limits of D90 include 0.1 μm or more, 0.2 μm or more, and 0.3 μm or more.

These upper limits and lower limits of D90 can be arbitrarily combined.

Examples of combinations include a D90 of 0.1 μm or more and 15 μm or less, 0.2 μm or more and 14.5 μm or less, and 0.3 μm or more and 14.0 μm or less.

As the solid electrolyte, a solid electrolyte having lithium-ion conductivity and used in a known all-solid-state battery can be used. Examples of such a solid electrolyte include an inorganic electrolyte and an organic electrolyte. Examples of inorganic electrolytes include an oxide-based solid electrolyte, a sulfide-based solid electrolyte, and a hydride-based solid electrolyte. Examples of organic electrolytes include a polymer-based solid electrolyte.

In the present embodiment, it is preferable to use an oxide-based solid electrolyte or a sulfide-based solid electrolyte and it is more preferable to use an oxide-based solid electrolyte.

(Oxide-Based Solid Electrolyte)

Examples of oxide-based solid electrolytes include a perovskite-type oxide, a NASICON-type oxide, a LISICON-type oxide, and a garnet-type oxide. Among these, a garnet-type oxide is preferable.

Examples of perovskite-type oxides include Li—La—Ti-based oxides such as $Li_aLa_{1-a}TiO_3$ (0<a<1), Li—La—Ta-based oxides such as $Li_bLa_{1-b}TaO_3$ (0<b<1), and Li—La—Nb-based oxides such as $Li_xLa_{1-c}NbO_3$ (0<c<1).

Examples of NASICON-type oxides include $Li_{1+d}Al_dTi_{2-d}(PO_4)_3$ (0<d<1). The NASICON-type oxide is an oxide represented by $Li_mM^1_nM^2_oP_pO_q$ (in the formula, $M^1$ is at least one element selected from the group consisting of B, Al, Ga, In, C, Si, Ge, Sn, Sb and Se, $M^2$ is at least one element selected from the group consisting of Ti, Zr, Ge, In, Ga, Sn and Al, and m, n, o, p and q are an arbitrary positive number).

Examples of LISICON-type oxides include oxides represented by $Li_4M^3O_4$—$Li_3M^4O_4$ ($M^3$ is at least one element selected from the group consisting of Si, Ge, and Ti, and $M^4$ is at least one element selected from the group consisting of P, As and V).

Examples of garnet-type oxides include Li—La—Zr-based oxides such as $Li_7La_3Zr_2O_{12}$ (LLZ).

The oxide-based solid electrolyte is preferably an oxide-based solid electrolyte having a melting point of 900° C. or lower.

The oxide-based solid electrolyte may be a crystalline material and may be an amorphous material. Examples of amorphous solid electrolytes include Li—B—O compounds such as $Li_3BO_3$, $Li_2B_4O_7$, and $LiBO_2$. The oxide-based solid electrolyte preferably contains an amorphous material.

(Sulfide-Based Solid Electrolyte)

Examples of sulfide-based solid electrolytes include $Li_2S$—$P_2S_5$-based compounds, $Li_2S$—$SiS_2$-based compounds, $Li_2S$—$GeS_2$-based compounds, $Li_2S$—$B_2S_3$-based compounds, $Li_2S$—$P_2S_3$-based compounds. LiI—$Si_2S$—$P_2S_5$-based compounds, LiI—$Li_2S$—$P_2O_5$-based compounds, LiI—$Li_3PO_4$—$P_2S_5$-based compounds, and $Li_{10}GeP_2S_{12}$.

Here, in this specification, the expression "-based compound" referring to a sulfide-based solid electrolyte is used as a general term for solid electrolytes mainly containing raw materials such as "$Li_2S$" and "$P_2S_5$" mentioned before "-based compound." For example, the $Li_2S$—$P_2S_5$-based compound contains a solid electrolyte containing $Li_2S$ and $P_2S_5$, and further containing other raw materials. In addition, the $Li_2S$—$P_2S_5$-based compound also includes solid electrolytes having different mixing ratios of $Li_2S$ and $P_2S_5$.

Examples of $Li_2S$—$P_2S_5$-based compounds include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, and $Li_2S$—$P_2S_5$—$Z_mS_n$ (m and n are a positive number, and Z is Ge, Zn or Ga).

Examples of $Li_2S$—$SiS_2$-based compounds include $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$Li_3PO_4$, $Li_2S$—$SiS_2$—$Li_2SO_4$, and $Li_2S$—$SiS_2$-$Li_xMO_y$ (x and y are a positive number, and M is P, Si, Ge, B, Al, Ga or In).

Examples of $Li_2S$—$GeS_2$-based compounds include $Li_2S$—$GeS_2$ and $Li_2S$—$GeS_2$—$P_2S_5$.

The sulfide-based solid electrolyte may be a crystalline material and may be an amorphous material. The sulfide-based solid electrolyte preferably contains an amorphous material.

(Hydride-Based Solid Electrolyte)

Examples of hydride-based solid electrolyte materials include $LiBH_4$, $LiBH_4$-3KI, $LiBH_4$—$PI_2$, $LiBH_4$—$P_2S_5$, LiBH$_4$—LiNH$_2$, 3LiBH$_4$—LiI, LiNH$_2$, Li$_2$AH$_6$, Li(NH$_2$)$_2$I, Li$_2$NH, LiGd(BH$_4$)$_3$Cl, Li$_2$(BH$_4$)(NH$_2$), Li$_3$(NH$_2$)I, and Li$_4$(BH$_4$)(NH$_2$)$_3$.

Examples of polymer-based solid electrolytes include organic polymer electrolytes such as polyethylene oxide-based polymer compounds and polymer compounds containing at least one selected from the group consisting of polyorganosiloxane chains and polyoxyalkylene chains.

Two or more types of solid electrolytes can be used in combination as long as the effects of the invention are not impaired.

According to studies by the inventors, it has been found that, although a positive electrode active material exhibits favorable battery performance when used for a positive electrode of a conventional liquid-based lithium-ion secondary battery, it exhibits insufficient performance when used for a positive electrode of an all-solid-state lithium-ion battery.

Based on the findings specific to such an all-solid-state lithium-ion battery, the inventors conducted studies and found that, when the mixed powder satisfying the above requirement 1, Formula (1) and Formula (2) is used for a positive electrode of an all-solid-state lithium-ion battery, the initial charging and discharging efficiency is improved.

First, when the mixed powder satisfies the requirement 1, it can favorably insert and desorb lithium-ions.

In addition, the mixed powder satisfies Formula (1) and Formula (2). In a positive electrode of an all-solid-state lithium-ion battery, the positive electrode active material exchanges lithium-ions between the positive electrode active material and the solid electrolyte. In such an all-solid-state lithium-ion battery, a sharp particle diameter distribution satisfying Formula (1) and Formula (2) is provided, and thus the positive electrode active materials or the positive electrode active material and the solid electrolyte are uniformly mixed, and the contact area is likely to expand. Thereby, when the mixed powder is used for a positive electrode of an all-solid-state lithium-ion battery, lithium-ions are easily exchanged between the positive electrode active material and the solid electrolyte.

Therefore, when the positive electrode active material satisfying the requirement 1, Formula (1) and Formula (2) is used for a positive electrode of an all-solid-state lithium-ion battery, it is possible to smoothly exchange lithium-ions with the solid electrolyte, and it is possible to improve initial charging and discharging efficiency.

The battery performance of the all-solid-state lithium-ion battery can be evaluated by the initial charging and discharging efficiency obtained by the following method.

<Production of all-Solid-State Lithium-Ion Battery>
(Production of Positive Electrode Active Material Sheet)

A resin binder (ethyl cellulose), a plasticizer (dioctyl phthalate), and a solvent (acetone) are added to the mixed powder for an all-solid-state lithium-ion battery so that the composition has a ratio of the mixed powder:resin binder:plasticizer:solvent=100:10:10:100 (mass ratio), and mixed using a planetary stirring/defoaming device.

The obtained slurry is defoamed using a planetary stirring/defoaming device to obtain a positive electrode mixture slurry.

The obtained positive electrode mixture slurry is applied onto a PET film using a doctor blade, and the coating film is dried to form a positive electrode film having a thickness of 50 μm.

The positive electrode film is peeled off from the PET film and punched into a circle having a diameter of 14.5 mm, and additionally pressed uniaxially at 20 MPa in the thickness direction of the positive electrode film for 1 minute to obtain a positive electrode active material sheet having a thickness of 40 μm.

(Production of all-Solid-State Lithium-Ion Battery)

A positive electrode active material sheet and a solid electrolyte pellet of Li$_{6.75}$La$_3$Zr$_{1.75}$Nb$_{0.25}$O$_{12}$ (for example, commercially available from Toshima & Co., Ltd.) are laminated, and uniaxially pressed parallel to the lamination direction to obtain a laminate.

A positive electrode current collector (gold foil with a thickness of 500 μm) is additionally laminated on the positive electrode active material sheet of the obtained laminate, and heated at 300° C. for 1 hour when pressurized at 100 gf, and organic components are burned. In addition, after the temperature is raised to 800° C. at 5° C./min, sintering is performed at 800° C. for 1 hour to obtain a laminate of a solid electrolyte layer and a positive electrode.

Next, the following operation is performed in an argon atmosphere glove box.

A negative electrode (Li foil with a thickness of 300 μm), a negative electrode current collector (stainless steel plate with a thickness of 50 μm), and a waved washer (made of stainless steel) are additionally laminated on the solid electrolyte layer in the laminate of the solid electrolyte layer and the positive electrode.

For the laminate laminated from the positive electrode to the waved washer, the positive electrode is placed on a lower lid of parts for a coin type battery R2032 (commercially available from Hohsen Corporation), it is stacked on the waved washer and covered with an upper lid, and an all-solid-state lithium-ion battery is produced by caulking with a caulking machine.

<Charging and Discharging Test>

Using the all-solid-state lithium-ion battery produced by the above method, the charging and discharging test was performed under the following conditions, and the initial charging and discharging efficiency was calculated.

(Charging and Discharging Conditions)

A test temperature of 60° C.

A maximum charging voltage of 4.3 V and a charging current density of 0.01C A minimum discharging voltage of 2.0 V, a discharging current density of 0.01C, and a cutoff of 0.002C <Calculation of Initial Charging and Discharging Efficiency>

From the charging capacity and the discharging capacity when charging and discharging are performed under the above conditions, the initial charging and discharging efficiency is obtained based on the following calculation formula Initial charging and discharging efficiency (%)=initial discharging capacity (mAh/g)/initial charging capacity (mAh/g)×100

(Other Configuration 1)

In the positive electrode active material, particles constituting the positive electrode active material are preferably composed of primary particles, secondary particles which are aggregates of the primary particles, and single particles that exist independently of the primary particles and the secondary particles.

<Method of Confirming Particle Shape>

In the present invention, "primary particles" are particles having no grain boundaries in appearance when observed using a scanning electron microscope in a field of view of 20,000×, and indicate particles having a particle diameter of less than 0.5 μm.

In the present invention, "secondary particles" are particles formed by aggregating primary particles. When secondary particles are observed using a scanning electron microscope in a field of view of 20,000×, grain boundaries are present in appearance.

In the present invention, "single particles" are particles that are present independently of secondary particles and have no grain boundaries in appearance when observed using a scanning electron microscope in a field of view of 20,000×, and indicate particles having a particle diameter of 0.5 μm or more.

That is, the positive electrode active material is composed of particles having no grain boundaries in appearance and particles having grain boundaries in appearance when observed using a scanning electron microscope in a field of view of 20,000×.

Particles having no grain boundaries in appearance are composed of "primary particles" having a small particle diameter and "single particles" having a large particle diameter based on a particle diameter of 0.5 μm.

Particles having grain boundaries in appearance are "secondary particles" which are aggregates of the above "primary particles."

In the positive electrode active material, the amount of single particles in all the particles is preferably 20% or more in terms of number percentage. When the positive electrode active material in which the amount of single particles in all the particles is 20% or more is used in an all-solid-state lithium-ion battery, it is easy to secure the contact interface with the solid electrolyte in the positive electrode layer, and conduction of lithium-ions is smoothly performed through the interface.

In addition, in the positive electrode active material in which the amount of single particles in all the particles is 20% or more, since there are no grain boundaries within single particles in all the particles, even if it is used in a positive electrode of an all-solid-state lithium-ion battery and charging and discharging are repeatedly performed, the particles are not easily broken and the conductive path is easily maintained.

The average particle diameter of the single particles is preferably 0.5 μm or more, and more preferably 1.0 μm or more. In addition, the average particle diameter of the single particles is preferably 10 μm or less, and more preferably 5 μm or less.

The upper limit values and the lower limit values of the average particle diameter of the single particles can be arbitrarily combined.

Examples of combinations of the upper limit value and the lower limit value of the average particle diameter of the single particles include 0.5 μm or more and 10 μm or less and 1.0 μm or more and 5 μm or less.

The average particle diameter of the secondary particles is preferably 3.0 μm or more and more preferably 5.0 μm or more. In addition, the average particle diameter of the secondary particles is preferably 15 μm or less and more preferably 10 μm or less.

The upper limit values and the lower limit values of the average particle diameter of the secondary particles can be arbitrarily combined.

Examples of combinations of the upper limit value and the lower limit value of the average particle diameter of the secondary particles include 3.0 μm or more and 15 μm or less, and 5.0 μm or more and 10 μm or less.

The average particle diameter of the single particles and the secondary particles can be measured by the following method.

First, the positive electrode active material is placed on a conductive sheet attached to a sample stage. Next, using a scanning electron microscope (JSM-5510 (commercially available from JEOL Ltd.)), an electron beam having an acceleration voltage of 20 kV is emitted to the positive electrode active material, and observation is performed in a field of view of 20,000×.

Next, 50 or more and 98 or fewer single particles or secondary particles are extracted from the obtained electron microscope image (SEM image) by the following method.

(Method of Extracting Single Particles)

When the average particle diameter of the single particles is measured, in a field of view magnified 20,000×, all single particles included in one field of view are measurement targets. When the number of single particles included in one field of view is less than 50, single particles in a plurality of fields of view are measurement targets before the number of particles measured is 50 or more.

(Method of Extracting Secondary Particles)

When the average particle diameter of the secondary particles is measured, in a field of view magnified 20,000×, all secondary particles included in one field of view are measurement targets. When the number of secondary particles included in one field of view is less than 50, secondary particles in a plurality of fields of view are measurement targets before the number of particles measured is 50 or more.

For the image of the extracted single particles or secondary particles, the distance between parallel lines (diameter in the constant direction) drawn from a certain direction when interposed between the parallel lines is measured as the particle diameter of the single particles or the secondary particles.

The arithmetic mean value of the obtained particle diameters of the single particles or secondary particles is the average particle diameter of the single particles contained in the positive electrode active material or the average particle diameter of the secondary particles contained in the positive electrode active material.

<Method of Calculating Amount of Single Particles>

The positive electrode active material powder is observed using a scanning electron microscope at 20,000×, and the numbers of single particles and secondary particles in the observed field of view are counted. The number of single particles is N1, the number of secondary particles is N2, and the number percentage of single particles is calculated by N1/(N1+N2)[%]. Here, when the number of particles that can be observed is less than 50, a plurality of continuous fields of view are acquired and observed before 50 particles can be confirmed.

(Other Configuration 2)

The positive electrode active material in the present embodiment preferably has a coating layer composed of a metal composite oxide on the surface of lithium metal composite oxide particles constituting the positive electrode active material.

As the metal composite oxide constituting the coating layer, an oxide having lithium-ion conductivity is preferably used.

It is known that, even if the metal composite oxide constituting the coating layer does not have lithium-ion conductivity, if the coating layer is a very thin film (for example, 0.1 nm or more and 1.0 nm or less), the battery performance is improved as compared with the positive electrode active material having no coating layer. In this case, it is speculated that lithium-ion conductivity is exhibited in the coating layer. However, a method of producing a positive electrode active material by forming a uniform coating layer on the surface of lithium metal composite oxide particles, controlling the thickness to 0.1 nm or more and 1.0 nm or less and performing adhering is a production method limited by poor mass productivity. As a production method with such poor mass productivity, for example, an atomic laser deposition (ALD) method is an exemplary example.

On the other hand, when the metal composite oxide constituting the coating layer has lithium-ion conductivity, this is preferable because the coating layer suitably conducts lithium-ions, and the battery performance can be improved even if the thickness of the coating layer is about 5 nm to 20 nm.

Here, the thickness of the coating layer can be measured for a positive electrode active material having a maximum diameter of a 50% cumulative volume particle diameter D50 (μm)±5% obtained by laser diffraction type particle diameter distribution measurement. The arithmetic mean value of the values measured for 10 particles is used as the thickness of the coating layer.

For positive electrode active material particles which are measurement targets, the average thickness of the coating layer is determined from the analysis results using scanning transmission electron microscope (STEM)-energy dispersive X-ray spectroscopy (EDX). A line profile of an element specific to the coating layer is created, and based on the obtained line profile, the range in which the above specific element is detected is set as the range in which the coating layer is present, and the thickness of the coating layer can be determined.

Examples of such metal composite oxides include metal composite oxides of Li and at least one element selected from the group consisting of Nb, Ge, Si, P, Al, W, Ta, Ti, S. Zr, Zn, V and B.

When the positive electrode active material has a coating layer, it is difficult to form a high resistance layer at the interface between the positive electrode active material and the solid electrolyte, and a high output of the all-solid-state lithium-ion battery can be realized. Such an effect is particularly easily obtained in a sulfide-based all-solid-state battery using a sulfide-based solid electrolyte as a solid electrolyte.

<Method of Producing a Positive Electrode Active Material 1>

When the lithium metal composite oxide containing a positive electrode active material is produced, first, a metal composite compound containing a metal element other than Li among metal elements constituting a lithium metal composite oxide as a desired product is prepared, and it is preferable to calcine the metal composite compound with an appropriate lithium compound, and an inactive melting agent.

Specifically, the "metal composite compound" is a compound including Ni, which is an essential metal element, and at least one optional element among Co, Mn, Fe, Cu. Ti, Mg, Al, W, B, Mo, Nb, Zn, Sn, Zr, Ga, La and V.

The metal composite compound is preferably a metal composite hydroxide or a metal composite oxide.

Hereinafter, an example of a method of producing a lithium metal composite oxide will be described separately for a process of producing a metal composite compound and a process of producing a lithium metal composite oxide.

(Process of Producing Metal Composite Compound)

The metal composite compound can be produced by a commonly known coprecipitation method. As the coprecipitation method, a commonly known batch type coprecipitation method or a continuous type coprecipitation method can be used. Hereinafter, a method of producing a metal composite compound will be described in detail using a metal composite hydroxide containing Ni, Co and Mn as a metal element as an example.

First, according to a coprecipitation method, and particularly, a continuous type coprecipitation method described in JP-A-2002-201028, a nickel salt solution, a cobalt salt solution, a manganese salt solution, and a complexing agent are reacted to produce a metal composite hydroxide represented by $Ni_{(1-y-z)}Co_yMn_z(OH)_2$ (in the formula, y+z<1).

The nickel salt which is a solute in the nickel salt solution is not particularly limited, and for example, any one or more of nickel sulfate, nickel nitrate, nickel chloride and nickel acetate can be used.

As a cobalt salt which is a solute in the cobalt salt solution, for example, any one or more of cobalt sulfate, cobalt nitrate, cobalt chloride, and cobalt acetate can be used.

As a manganese salt which is a solute in the manganese salt solution, for example, any one or more of manganese sulfate, manganese nitrate, manganese chloride, and manganese acetate can be used.

The above metal salts are used in a ratio corresponding to the composition ratio of $Ni_{(1-y-z)}Co_yMn_z(OH)_2$. That is, each metal salt is used in an amount at which a molar ratio of nickel in the solute in the nickel salt solution, cobalt in the solute in the cobalt salt solution, and manganese in the solute of the manganese salt solution is (1−y−z):y:z corresponding to the composition ratio of $Ni_{(1-y-z)}Co_yMn_z(OH)_2$.

In addition, the solvent for the nickel salt solution, the cobalt salt solution, and the manganese salt solution is water. That is, the solvent for the nickel salt solution, the cobalt salt solution, and the manganese salt solution is an aqueous solution.

The complexing agent is a compound that allows a complex with nickel ions, cobalt ions, and manganese ions to be formed in an aqueous solution. Examples of complexing agents include ammonium ion feeders, hydrazine, ethylenediaminetetraacetic acid, nitrilotriacetic acid, uracil diacetic acid, and glycine. Examples of ammonium ion feeders include ammonium salts such as ammonium hydroxide, ammonium sulfate, ammonium chloride, ammonium carbonate, and ammonium fluoride.

In a process of producing a metal composite hydroxide, a complexing agent may or may not be used. When a complexing agent is used, the amount of the complexing agent contained in a mixed solution containing a nickel salt solution, an arbitrary metal salt solution and a complexing agent is such that, for example, the molar ratio with respect to the total number of moles of the metal salt is more than 0 and 2.0 or less.

In the present embodiment, the amount of the complexing agent contained in a mixed solution containing a nickel salt solution, a cobalt salt solution, a manganese salt solution and a complexing agent is such that, for example, the molar ratio with respect to the total number of moles of the metal salt is more than 0 and 2.0 or less.

In the coprecipitation method, in order to adjust the pH value of the mixed solution containing a nickel salt solution, an arbitrary metal salt solution and a complexing agent, an alkali metal hydroxide is added to the mixed solution before the pH of the mixed solution changes from alkaline to neutral. The alkali metal hydroxide is, for example, sodium hydroxide or potassium hydroxide.

Here, the pH value in this specification is defined as a value measured when the temperature of the mixed solution is 40° C. The pH of the mixed solution is measured when the temperature of the mixed solution sampled from the reaction chamber reaches 40° C.

When the complexing agent is continuously supplied to the reaction chamber in addition to the nickel salt solution, the cobalt salt solution, and the manganese salt solution, Ni, Co, and Mn react with each other and $Ni_{(1-y-z)}Co_yMn_z(OH)_2$ is generated.

In the reaction, the temperature of the reaction chamber is controlled such that it is, for example, within a range of 20° C. or higher and 80° C. or lower, and preferably 30° C. or higher and 70° C. or lower.

In addition, in the reaction, the pH value in the reaction chamber is controlled such that it is, for example, within a range of pH 9 or more and pH 13 or less, and preferably pH 11 or more and pH 13 or less.

The substances in the reaction chamber are appropriately stirred and mixed.

As the reaction chamber used in the continuous type coprecipitation method, a type of a reaction chamber in which the formed reaction precipitate is caused to overflow for separation can be used.

When a metal salt concentration, a stirring speed, a reaction temperature, a reaction pH, calcining conditions to be described below and the like of the metal salt solution supplied to the reaction chamber are appropriately controlled, it is possible to control various physical properties such as the secondary particle diameter and the pore radius of the finally obtained lithium metal composite oxide.

In addition to controlling the above conditions, various gases, for example, inert gases such as nitrogen, argon, and carbon dioxide, oxidizing gases such as air and oxygen, or mixed gases thereof are supplied into the reaction chamber, and the oxidation state of the obtained reaction product may be controlled.

As a compound (oxidizing agent) that oxidizes the obtained reaction product, a peroxide such as hydrogen peroxide, a peroxide salt such as permanganate, perchlorate, hypochlorite, nitric acid, halogen, ozone or the like can be used.

As a compound that reduces the obtained reaction product, an organic acid such as oxalic acid or formic acid, a sulfite, hydrazine or the like can be used.

Specifically, the inside of the reaction chamber may have an inert atmosphere. When the inside of the reaction chamber has an inert atmosphere, among metal elements contained in the mixed solution, metal elements that are more easily oxidized than Ni are prevented from aggregating prior to Ni. Therefore, a uniform metal composite hydroxide can be obtained.

In addition, the inside of the reaction chamber may have an appropriate oxidizing atmosphere. The oxidizing atmosphere may be an oxygen-containing atmosphere in which an oxidizing gas is mixed with an inert gas, and when the inside of the reaction chamber in which an oxidizing agent may be present under an inert gas atmosphere has an appropriate oxidizing atmosphere, transition metals contained in the mixed solution are appropriately oxidized, and the morphology of the metal composite oxide can be easily controlled.

Oxygen and an oxidizing agent in the oxidizing atmosphere only need to have sufficient oxygen atoms to oxidize transition metals.

When the oxidizing atmosphere is an oxygen-containing atmosphere, the atmosphere in the reaction chamber can be controlled by a method such as aeration of an oxidizing gas in the reaction chamber, bubbling an oxidizing gas in the mixed solution or the like.

After the above reaction, the obtained reaction precipitate is washed with water and then dried to obtain a metal composite compound. In the present embodiment, a nickel cobalt manganese hydroxide is obtained as the metal composite compound. In addition, when impurities derived from the mixed solution remain if the reaction precipitate is simply washed with water, as necessary, the reaction precipitate may be washed with weak acid water or an alkaline solution. Examples of alkaline solutions include an aqueous solution containing sodium hydroxide and potassium hydroxide.

In the present embodiment, when an appropriate external force is applied to the metal composite compound obtained by drying and crushing is performed to adjust the dispersed state of particles, it is possible to obtain a metal composite hydroxide in which (D90−D10)/D50 of the positive electrode active material can be easily controlled such that it is within a range of the present embodiment.

An "appropriate external force" is an external force to the extent at which the aggregated state is dispersed without breaking crystallites of the metal composite compound. In the present embodiment, during the above crushing, it is preferable to use a grinding machine as a crusher, and it is particularly preferable to use a millstone type grinding machine. When a millstone type grinding machine is used, it is preferable to adjust the clearance between the upper millstone and the lower millstone according to the aggregated state of the metal composite hydroxide. The clearance between the upper millstone and the lower millstone is preferably, for example, in a range of 10 μm or more and 200 μm or less.

In addition, in the above example, a nickel cobalt manganese composite hydroxide is produced, but a nickel cobalt manganese composite oxide may be prepared.

For example, a nickel cobalt manganese composite oxide can be prepared by oxidizing a nickel cobalt manganese composite hydroxide.

(Process of Producing Lithium Metal Composite Oxide)

In this process, a metal composite oxide or a metal composite hydroxide is dried and the metal composite oxide or the metal composite hydroxide is then mixed with a lithium compound. In addition, in the present embodiment, when a metal composite oxide or a metal composite hydroxide and a lithium compound are mixed, it is preferable to mix an inactive melting agent at the same time.

When a mixture containing a metal composite oxide, a lithium compound and an inactive melting agent or a mixture containing a metal composite hydroxide, a lithium compound and an inactive melting agent is calcined, in the presence of an inactive melting agent, a mixture containing a metal composite compound and a lithium compound is calcined. When a mixture containing a metal composite compound and a lithium compound is calcined in the presence of an inactive melting agent, secondary particles in which primary particles are sintered with each other are less likely to be generated. In addition, the growth of single particles can be promoted.

As the lithium compound, any one of lithium carbonate, lithium nitrate, lithium acetate, lithium hydroxide, lithium hydroxide, lithium oxide, lithium chloride, and lithium fluoride can be used or two or more thereof can be used in combination. Among these, either or both of lithium hydroxide and lithium carbonate are preferable.

When lithium hydroxide contains lithium carbonate as impurities, the amount of lithium carbonate in lithium hydroxide is preferably 5 mass % or less.

Drying conditions of the metal composite oxide or metal composite hydroxide are not particularly limited. The drying conditions may be, for example, any of the following conditions 1) to 3).

1) Conditions in which a metal composite oxide or a metal composite hydroxide is not oxidized or reduced. Specifically, drying conditions in which an oxide is maintained as an oxide without change and drying conditions in which a hydroxide is maintained as a hydroxide without change.

2) Conditions in which a metal composite hydroxide is oxidized. Specifically, drying conditions in which a hydroxide is oxidized to an oxide.

3) Conditions in which a metal composite oxide is reduced. Specifically, drying conditions in which an oxide is reduced to a hydroxide.

In order to set a condition in which oxidation or reduction does not occur, an inert gas such as nitrogen, helium or argon may be used in an atmosphere during drying.

In order to set a condition in which a hydroxide is oxidized, oxygen or air may be used in an atmosphere during drying.

In addition, in order to set a condition in which a metal composite oxide is reduced, a reducing agent such as hydrazine or sodium sulfite may be used under an inert gas atmosphere during drying.

After the metal composite oxide or the metal composite hydroxide is dried, classification may be appropriately performed.

The above lithium compound and metal composite compound are used in consideration of the composition ratio of the final desired product. For example, when a nickel cobalt manganese composite compound is used, the lithium compound and the metal composite compound are used in a ratio corresponding to the composition ratio of $Li[Li_x(Ni_{1-y-z}Co_yMn_z]O_2$.

In addition, in the lithium metal composite oxide which is the final desired product, when the amount of Li is excessive (the content molar ratio is more than 1), mixing is performed in proportions such that the molar ratio between Li contained in the lithium compound and metal elements contained in the metal composite compound is a ratio exceeding 1.

When a mixture of a nickel cobalt manganese composite compound and a lithium compound is calcined, a lithium-nickel cobalt manganese composite oxide can be obtained. Here, for calcining, dry air, an oxygen atmosphere, an inert atmosphere or the like is used according to a desired composition, and if necessary, a plurality of calcining processes are performed.

In the present embodiment, the mixture may be calcined in the presence of an inactive melting agent. When calcining is performed in the presence of an inactive melting agent, the reaction of the mixture can be promoted. The inactive melting agent may remain in the lithium metal composite oxide after calcining or may be removed by washing with water or an alcohol after calcining.

In the present embodiment, the lithium metal composite oxide after calcining is preferably washed with pure water, an alcohol or an alkaline washing solution.

When the retention temperature in calcining is adjusted, the particle diameter of the single particles can be controlled such that it is within a preferable range of the present embodiment.

Generally, when the retention temperature is higher, the particle diameter of the single particles is larger, and the BET specific surface area tends to be small. The retention temperature in calcining may be appropriately adjusted according to the type of a transition metal element used, and the type and amount of a precipitant, and an inactive melting agent.

The retention temperature may be set in consideration of the melting point of the inactive melting agent to be described below, and is preferably in a range of [the melting point of the inactive melting agent −200° C.] or higher and [the melting point of the inactive melting agent +200° C.] or lower.

As the retention temperature, specifically, a range of 200° C. or higher and 1,150° C. or lower is an exemplary example, and the retention temperature is preferably 300° C. or higher and 1,050° C. or lower, and more preferably 500° C. or higher and 1,000° C. or lower.

In addition, the retention time at the retention temperature may be, for example, 0.1 hours or more and 20 hours or less, and is preferably 0.5 hours or more and 10 hours or less. The rate of temperature rise to the retention temperature is generally 50° C./hour or more and 400° C./hour or less, and the rate of temperature drop from the retention temperature to room temperature is generally 1° C./hour or more and 400° C./hour or less. In addition, as a calcining atmosphere, air, oxygen, nitrogen, argon or a mixed gas thereof can be used.

The lithium metal composite oxide obtained by calcining is appropriately classified after crushing to obtain a positive electrode active material that can be applied to an all-solid-state lithium-ion battery.

In the present embodiment, the lithium metal composite oxide obtained by calcining is crushed by applying an appropriate external force, the dispersed state of particles is adjusted, and thus a positive electrode active material satisfying Formula (1) can be obtained.

An "appropriate external force" is an external force to the extent at which the aggregated state is dispersed without breaking crystallites of the lithium metal composite oxide. In the present embodiment, during the above crushing, it is preferable to use a grinding machine as a crusher, and it is particularly preferable to use a millstone type grinding machine. When a millstone type grinding machine is used, it is preferable to adjust the clearance between the upper millstone and the lower millstone according to the aggregated state of the lithium metal composite oxide. The clearance between the upper millstone and the lower millstone is preferably, for example, in a range of 10 μm or more and 200 μm or less.

The inactive melting agent is not particularly limited as long as it does not easily react with the mixture during calcining. In the present embodiment, one or more selected from the group consisting of fluorides of at least one element (hereinafter referred to as "A") selected from the group consisting of Na, K, Rb, Cs, Ca, Mg, Sr and Ba, chlorides of A, carbonates of A, sulfates of A, nitrates of A, phosphates of A, hydroxides of A, molybdates of A and tungstates of A is an exemplary example.

Examples of fluorides of A include NaF (melting point: 993° C.), KF (melting point: 858° C.), RbF (melting point: 795° C.), CsF (melting point: 682° C.), $CaF_2$ (melting point: 1,402° C.), $MgF_2$ (melting point: 1,263° C.), $SrF_2$ (melting point: 1,473° C.) and $BaF_2$ (melting point: 1.355° C.).

Examples of chlorides of A include NaCl (melting point: 801° C.), KCl (melting point; 770° C.), RbCl (melting point: 718° C.), CsCl (melting point: 645° C.), $CaCl_2$ (melting point: 782° C.), MgCl$_2$ (melting point: 714° C.), SrCl$_2$ (melting point: 857° C.) and BaCl$_2$ (melting point: 963° C.).

Examples of carbonates of A include Na$_2$CO$_3$ (melting point: 854° C.), K$_2$CO$_3$ (melting point: 899° C.), Rb$_2$CO$_z$ (melting point: 837° C.), Cs$_2$CO$_3$ (melting point: 793° C.), CaCO$_3$ (melting point: 825° C.), MgCO$_3$ (melting point: 990° C.), SrCO$_3$ (melting point: 1,497° C.) and BaCO$_3$ (melting point: 1,380° C.).

As the nitrates of A, the phosphates of A, the hydroxides of A, the molybdates of A and the tungstates of A, compounds described in JP6734491B is an exemplary example.

In the present embodiment, two or more types of these inactive melting agents can be used. When two or more types are used, the melting point of all of the inactive melting agents may decrease.

In addition, among these inactive melting agents, at least one salt selected from the group consisting of carbonates of A, sulfates of A and chlorides of A is preferable as an inactive melting agent for obtaining a lithium metal composite oxide with higher crystallinity.

In addition, A is preferably either or both of Na and K.

That is, among the above inactive melting agents, particularly preferably, an inactive melting agent is preferably at least one selected from the group consisting of NaCl, KCl, Na$_2$CO$_3$, K$_2$CO$_3$, Na$_2$SO$_4$, and K$_2$SO$_4$, and it is more preferable to use either or both of K$_2$SO$_4$ and Na$_2$SO$_4$.

The abundance of the inactive melting agent during calcining may be appropriately selected. As an example, the abundance of the inactive melting agent during calcining with respect to 100 parts by mass of the lithium compound is preferably 0.1 parts by mass or more and more preferably 1 part by mass or more.

In addition, in order to further promote the crystal growth, an inactive melting agent other than the above exemplified inactive melting agents may be used in combination. Examples of inactive melting agents used in this case include ammonium salts such as NH$_4$Cl and NH$_4$F.

(Process of Forming Coating Layer)

When a coating layer is formed on the surface of lithium metal composite oxide particles, first, a coating material raw material and a lithium metal composite oxide are mixed. Next, as necessary, a heat treatment is performed, and thus a coating layer composed of a metal composite oxide can be formed on the surface of lithium metal composite oxide particles.

Depending on the type of the coating material raw material, in the above process of producing a lithium metal composite oxide, when a metal composite compound and a lithium compound are mixed, a coating material raw material can be additionally added and mixed.

As the method of forming a coating layer and the coating material raw material in the present embodiment, methods and coating material raw materials described in JP6734491B can be applied.

Particles in which a coating layer is formed on the surface of primary particles or secondary particles of a lithium metal composite oxide are appropriately crushed and classified to form a positive electrode active material.

<Method of Producing a Positive Electrode Active Material 2>

When the positive electrode active material contains single particles and secondary particles, a positive electrode active material can be produced from the above method of producing a positive electrode active material 1 by performing the following change.

(Process of Producing Metal Composite Compound)

In the method of producing a positive electrode active material 2, in the process of producing a metal composite compound, a metal composite compound that finally forms single particles and a metal composite compound that forms secondary particles are produced. Hereinafter, the metal composite compound that finally forms single particles may be referred to as a "single particle precursor." In addition, the metal composite compound that finally forms secondary particles may be referred to as a "secondary particle precursor."

In the method of producing a positive electrode active material 2, when a metal composite compound is produced by the above coprecipitation method, a first coprecipitation chamber for producing a single particle precursor and a second coprecipitation chamber for forming a secondary particle precursor are used.

A single particle precursor can be produced by appropriately controlling the concentration of the metal salt supplied into the first coprecipitation chamber, the stirring speed, the reaction temperature, the reaction pH, calcining conditions to be described below, and the like.

Specifically, the temperature of the reaction chamber is preferably, for example, 30° C. or higher and 80° C. or lower, and more preferably controlled such that it is within a range of 40° C. or higher and 70° C. or lower, and still more preferably within a range of +20° C. with respect to a second reaction chamber to be described below.

In addition, the pH value in the reaction chamber is, for example, preferably pH 10 or more and pH 13 or less, and is more preferably controlled such that it is within a range of pH 11 or more and pH 12.5 or less. In addition, the pH value is still more preferably within a range of ±pH 2 or less with respect to a second reaction chamber to be described below, and particularly preferably a pH higher than that of the second reaction chamber.

In addition, a secondary particle precursor can be produced by appropriately controlling the concentration of a metal salt supplied to the second coprecipitation chamber, the stirring speed, the reaction temperature, the reaction pH, calcining conditions to be described below, and the like.

Specifically, the temperature of the reaction chamber is preferably 20° C. or higher and 80° C. or lower, more preferably controlled such that it is within a range of 30° C. or higher and 70° C. or lower, and still more preferably within a range of 20° C. with respect to a second reaction chamber to be described below.

In addition, the pH value in the reaction chamber is, for example, preferably pH 10 or more and pH 13 or less, and is more preferably controlled such that it is within a range of pH 11 or more and pH 12.5 or less. In addition, the pH value is still more preferably within a range of ±pH 2 or less with respect to a second reaction chamber to be described below, and particularly preferably a pH lower than that of the second reaction chamber.

The reaction products obtained in this manner are washed with water and then dried to isolate the nickel cobalt manganese composite hydroxide. The nickel cobalt manganese composite hydroxide to be isolated contains a single particle precursor and a secondary particle precursor.

In addition, in the above example, a nickel cobalt manganese composite hydroxide is produced, but a nickel cobalt manganese composite oxide may be prepared. For example, a nickel cobalt manganese composite oxide can be prepared by oxidizing the nickel cobalt manganese composite hydroxide.

(Process of Producing Lithium Metal Composite Oxide)

In the process of producing a lithium metal composite oxide, the metal composite oxide or metal composite hydroxide as the single particle precursor and the secondary particle precursor obtained in the above process is dried and then mixed with a lithium compound. The single particle precursor and the secondary particle precursor may be appropriately classified after drying.

The abundance ratio of the single particles and the secondary particles in the obtained positive electrode active material can be roughly controlled by mixing the single particle precursor and the secondary particle precursor at a predetermined mass ratio during mixing.

Here, in the process after mixing, the single particle precursor and the secondary particle precursor are aggregated or separated, and secondary particles produced by aggregation of the single particle precursors and single particles produced by separation of the secondary particle precursors can also exist. When the mixing ratio between the single particle precursor and the secondary particle precursor, and conditions of the process after mixing are adjusted, it is possible to control the abundance ratio between the single particles and the secondary particles in the finally obtained positive electrode active material.

When the retention temperature in calcining is adjusted, the average particle diameter of the single particles and the average particle diameter of the secondary particles of the obtained lithium metal composite oxide can be controlled such that they are within a preferable range of the present embodiment.

<Method of Producing a Positive Electrode Active Material 3>

In addition, when the positive electrode active material contains single particles and secondary particles, according to the above method of producing a positive electrode active material 1, a first lithium metal composite oxide composed of single particles and a second lithium metal composite oxide composed of secondary particles are produced, and the first lithium metal composite oxide and the second lithium metal composite oxide can be mixed for production.

In the method of producing a positive electrode active material 3, in the process of producing a lithium metal composite oxide, the retention temperature when the first lithium metal composite oxide is calcined may be higher than the retention temperature when the second lithium metal composite oxide is calcined. Specifically, when the first lithium metal composite oxide is produced, the retention temperature is preferably 30° C. or higher, more preferably 50° C. or higher, and still more preferably 80° C. or higher than the retention temperature of the second lithium metal composite oxide.

When the obtained first lithium metal composite oxide and second lithium metal composite oxide are mixed at a predetermined ratio, a positive electrode active material containing single particles and secondary particles can be obtained.

<Method of Producing Mixed Powder>

The mixed powder can be produced by mixing the positive electrode active material obtained by the above method with a solid electrolyte.

It is preferable to mix the positive electrode active material and the solid electrolyte at a ratio (volume ratio) of 50:50 to 95:5.

The volume of the positive electrode active material or the solid electrolyte can be calculated by dividing the mass of the positive electrode active material or the solid electrolyte by the press density.

<Method of Measuring Press Density>

A method of measuring a press density in the present embodiment will be described with reference to FIG. 3.

Figure 3:
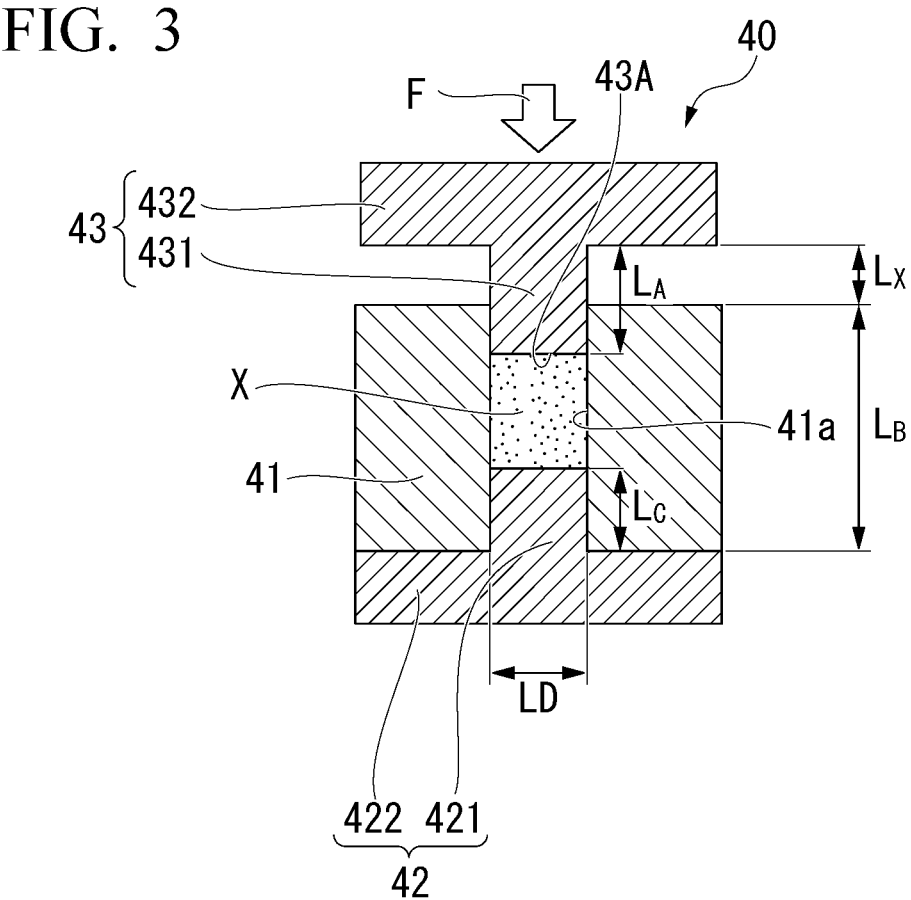
FIG. 3 is a schematic view for illustrating a method of measuring a press density.

A press density measuring device 40 shown in FIG. 3 includes jigs 41, 42, and 43.

The jig 41 has a cylindrical shape. An internal space 41a of the jig 41 is columnar. An inner diameter LD of the internal space 41a is 15 mm.

The jig 42 has columnar plug part 421 and a flange part 422 connected to the plug part 421. The plug part 421 and the flange part 422 are connected at the center of the flange part 422 in a plan view. The diameter of the plug part 421 is equal to the inner diameter LD of the jig 41, and is a size that fits into the internal space 41a of the jig 41 without a gap.

The jig 43 has the same shape as the jig 42, and has a columnar plug part 431 and a flange part 432 connected to the plug part 431. The diameter of the plug part 431 is equal to the inner diameter LD of the jig 41, and is a size that fits into the internal space 41a of the jig 41 without a gap.

The press density measuring device 40 is used when the plug part 421 of the jig 42 is inserted into the opening on one end side of the jig 41 and the plug part 431 of the jig 43 is inserted into the opening on the other end side of the jig 41.

In the measurement using the press density measuring device 40, first, the jig 42 is fitted to the jig 41, and when the flange part 422 is in contact with the jig 41, 3 g of a positive electrode active material X to be measured is filled into the internal space 41a. Next, the jig 43 is fitted into the jig 41, and the tip of the plug part 431 is brought into contact with the positive electrode active material X.

Next, a load F is applied to the jig 43 using a press machine, and a pressure is applied to the positive electrode active material X in the internal space 41a via the jig 43.

Since the area of a contact surface 43A of the jig 43 in contact with the positive electrode active material X is 177 mm², the load F is 8 kN. In the present embodiment, the load F is applied for 1 minute.

After the load is suspended and released, the length of the gap Lx between the jig 43 and the jig 41 is measured. The thickness of the positive electrode active material X is calculated by the following Formula (P1).

$$\text{Thickness (mm) of positive electrode active material } X = L_B + L_X - L_A - L_C \quad (P1)$$

In Formula (P1), $L_B$ is the height of the cylindrical jig 41. $L_X$ is the length of the gap between the jig 41 and the jig 43. $L_A$ is the height of the plug part 431 of the jig 43. $L_C$ is the height of the plug part 421 of the jig 42.

From the thickness of the obtained positive electrode active material X, the press density A is calculated by the following Formula (P2).

$$\text{Press density } A = \text{powder mass} \div \text{powder volume} \quad (P2)$$

In Formula (P2), the powder mass is the mass (g) of the positive electrode active material X filled into the density measuring device 40 shown in FIG. 3.

In Formula (P2), the powder volume is the product of the thickness (mm) of the positive electrode active material X calculated by Formula (P1) and the area of the contact surface 43A of the jig 43 in contact with the positive electrode active material X.

The press density of the solid electrolyte is calculated by the same method as above except that a solid electrolyte is used in place of the positive electrode active material X.

In addition, it is preferable to mix the positive electrode active material and the solid electrolyte at a ratio ((positive electrode active material D50)/(solid electrolyte D50)) of 0.1 or more and 10 or less.

As the solid electrolyte, a commercial product having a particle diameter distribution satisfying Formula (2) may be used, or a solid electrolyte adjusted to have a particle diameter distribution satisfying Formula (2) by a known method such as crushing may be used.

<Mixed Paste>

The present embodiment is a mixed paste containing the mixed powder of the present embodiment described above and an organic binder at a mass ratio of 10:90 to 90:10. As the organic binder used for the mixed paste, a binder used for a positive electrode active material layer to be described below can be used.

<all-Solid-State Lithium-Ion Battery>

Next, while explaining the configuration of the all-solid-state lithium-ion battery, a positive electrode using the mixed powder according to one aspect of the present invention as a positive electrode active material of an all-solid-state lithium-ion battery and an all-solid-state lithium-ion battery including this positive electrode will be described.

Figure 2:
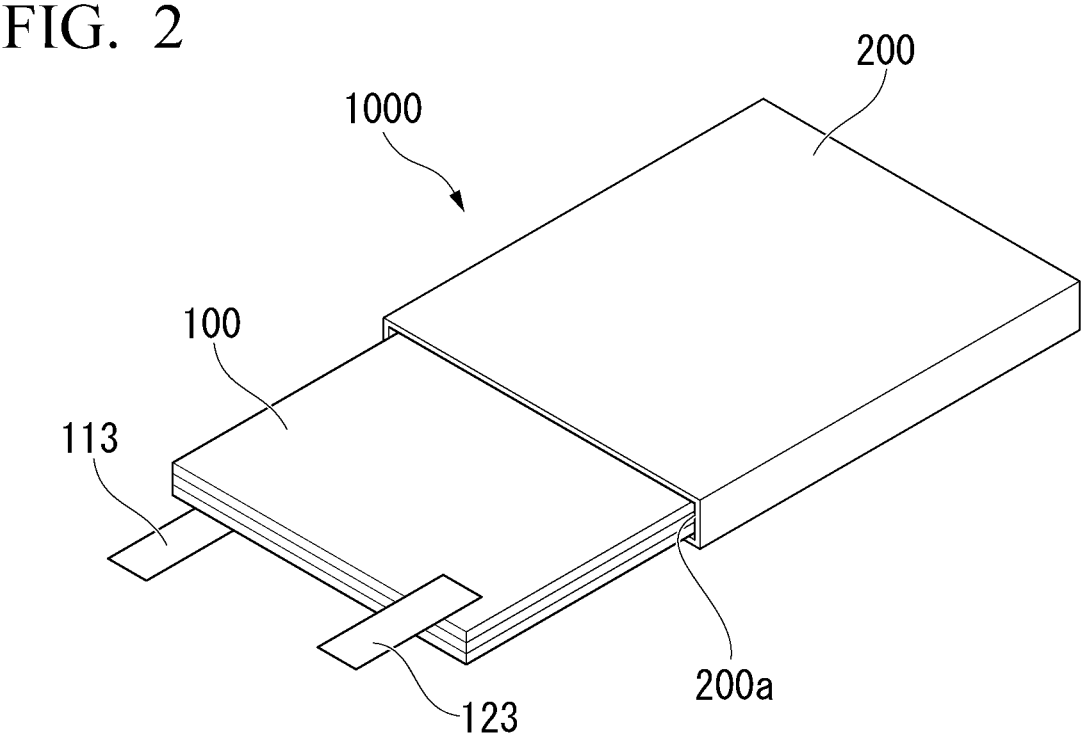
FIG. 2 is a schematic view showing an overall structure of the all-solid-state lithium-ion battery of the embodiment.

FIGS. 1 and 2 are a schematic view showing an example of an all-solid-state lithium-ion battery of the present embodiment. FIG. 1 is a schematic view showing a laminate included in the all-solid-state lithium-ion battery of the present embodiment. FIG. 2 is a schematic view showing an overall structure of the all-solid-state lithium-ion battery of the present embodiment. The all-solid-state lithium-ion battery of the present embodiment is a secondary battery.

An all-solid-state lithium-ion battery 1000 includes a positive electrode 110, a negative electrode 120, a laminate 100 having a solid electrolyte layer 130, and an exterior body 200 in which the laminate 100 is accommodated.

Materials that form respective members will be described below.

The laminate 100 may include an external terminal 113 connected to a positive electrode current collector 112 and an external terminal 123 connected to a negative electrode current collector 122.

In the laminate 100, the solid electrolyte layer 130 is interposed between the positive electrode 110 and the negative electrode 120 so that short-circuiting is not caused. In addition, the all-solid-state lithium-ion battery 1000 includes a separator used in a conventional liquid-based lithium-ion secondary battery between the positive electrode 110 and the negative electrode 120 to prevent short circuiting between the positive electrode 110 and the negative electrode 120.

The all-solid-state lithium-ion battery 1000 includes an insulator (not shown) that insulates the laminate 100 and the exterior body 200, and a sealant (not shown) that seals an opening 200a of the exterior body 200.

As the exterior body 200, a container molded of a metal material having high corrosion resistance such as aluminum, stainless steel, or nickel-plated steel can be used. In addition, a container in which a laminate film of which at least one surface is subjected to a corrosion resistant treatment is processed into a bag shape can be used.

Examples of shapes of the all-solid-state lithium-ion battery 1000 include shapes such as a coin shape, a button shape, a paper shape (or sheet shape), a cylindrical shape, and a square shape.

In the drawing, the all-solid-state lithium-ion battery 1000 has one laminate 100, but the present invention is not limited thereto. The all-solid-state lithium-ion battery 1000 may have a configuration in which the laminate 100 is used as a unit cell, and a plurality of unit cells (the laminate 100) are enclosed inside the exterior body 200.

Hereinafter, respective components will be described in order.

(Positive Electrode) The positive electrode 110 has a positive electrode active material layer 111 and the positive electrode current collector 112.

The positive electrode active material layer 111 contains the mixed powder which is one aspect of the present invention described above. In addition, the positive electrode active material layer 111 may contain a solid electrolyte (second solid electrolyte), a conductive material, and a binder in addition to the mixed powder.

The mixed powder contained in the positive electrode active material layer 111 is in contact with the second solid electrolyte contained in the positive electrode active material layer 111. Specifically, the positive electrode active material layer 111 contains a plurality of particles containing crystals of a lithium metal composite oxide (positive electrode active material) and a second solid electrolyte that is filled between the plurality of particles (positive electrode active material) and in contact with the particles (positive electrode active material).

(Solid Electrolyte)

The description of the second solid electrolyte that the positive electrode active material layer 111 may contain is the same as the description of the solid electrolyte in the above mixed powder description.

(Conductive Material)

As the conductive material that the positive electrode active material layer 111 may contain, a carbon material or a metal compound can be used. Examples of carbon materials include graphite powder, carbon black (for example, acetylene black), and fibrous carbon materials.

Since carbon black is fine and has a large surface area, w % ben an appropriate amount thereof is added to the positive electrode active material layer 111, the conductivity inside the positive electrode 110 can be improved, and charging efficiency, discharging efficiency and output characteristics can be improved.

On the other hand, when the amount of carbon black added is too large, the binding force between the positive electrode active material layer 111 and the positive electrode current collector 112 and the binding force inside the positive electrode active material layer 111 both decrease, which causes an increase in internal resistance. Examples of metal compounds include metals, metal alloys and metal oxides having electrical conductivity.

In the case of a carbon material, the proportion of the conductive material in the positive electrode active material layer 111 with respect to 100 parts by mass of the positive electrode active material is preferably 5 parts by mass or more and 20 parts by mass or less. When a fibrous carbon material such as graphitized carbon fibers or carbon nanotubes is used as the conductive material, the proportion thereof can be reduced.

(Binder)

When the positive electrode active material layer 111 contains a binder, a thermoplastic resin can be used as the binder. Examples of such a thermoplastic resin include a polyimide resin, a fluororesin, a polyolefin resin, and ethyl cellulose.

Examples of fluororesins include polyvinylidene fluoride, polytetrafluoroethylene, tetrafluoroethylene-propylene hexafluoride/vinylidene fluoride-based copolymers, propylene hexafluoride/vinylidene fluoride-based copolymers, and tetrafluoroethylene/perfluorovinyl ether-based copolymers.

Hereinafter, polyvinylidene fluoride may be referred to as PVdF.

Examples of polyolefin resins include polyethylene and polypropylene.

A mixture of two or more types of these thermoplastic resins may be used. When a fluororesin and a polyolefin resin are used as the binder, for example, the proportion of the fluororesin with respect to the entire positive electrode active material layer 111 may be 1 mass % or more and 10 mass % or less, and the proportion the polyolefin resin may be 0.1 mass % or more and 2 mass % or less. In this case, the positive electrode active material layer 111 has both an adhesive force between the positive electrode active material layer 111 and the positive electrode current collector 112 and a high bonding force inside the positive electrode active material layer 111.

The positive electrode active material layer 111 may be previously processed as a sheet-like molded article containing a positive electrode active material, and used as an "electrode" in the present invention. In addition, in the following description, such a sheet-like molded article may be referred to as a "positive electrode active material sheet." A laminate in which a current collector is laminated on the positive electrode active material sheet may be used as an electrode.

The positive electrode active material sheet may contain at least one selected from the group consisting of the above second solid electrolytes, conductive materials and binders.

The positive electrode active material sheet can be obtained, for example, by preparing a slurry by mixing a positive electrode active material, a sintering additive, the above conductive material, the above binder, a plasticizer, and a solvent, applying the obtained slurry onto a carrier film, and drying it.

Examples of sintering additives include $Li_3BO_3$ and $Al_2O_3$.

As the plasticizer, for example, dioctyl phthalate can be used.

As the solvent, for example, acetone, ethanol, or N-methyl-2-pyrrolidone can be used.

When a slurry is prepared, mixing can be performed using a ball null. Since the obtained mixture contains air bubbles mixed into during mixing in many cases, defoaming may be performed by decompression. When defoaming is performed, a part of the solvent volatilizes and concentrates, and thus the slurry becomes highly viscous.

The slurry can be applied using a known doctor blade.

As the carrier film, a PET film can be used.

The positive electrode active material sheet obtained after drying is peeled off from the carrier film, and appropriately processed into a required shape by punching and used. In addition, the positive electrode active material sheet may be appropriately uniaxially pressed in the thickness direction.

(Positive Electrode Current Collector)

As the positive electrode current collector 112 included in the positive electrode 110, a sheet-like member made of a metal material such as Al, Ni, stainless steel, or Au as a forming material can be used. Among these, preferably. Al is used as a forming material and processed into a thin film because it is easy to process and inexpensive.

As a method of supporting the positive electrode active material layer 111 on the positive electrode current collector 112, a method of press-molding the positive electrode active material layer 111 on the positive electrode current collector 112 is an exemplary example. For press-molding, cold pressing or hot pressing can be used.

In addition, a mixture of the mixed powder, the second solid electrolyte, the conductive material, the binder and the like is made into a paste using an organic solvent to form a positive electrode mixture, the obtained positive electrode mixture is applied to at least one side of the positive electrode current collector 112 and dried, pressing and fixing may be performed to support the positive electrode active material layer 111 on the positive electrode current collector 112.

In addition, a mixture of the mixed powder, the second solid electrolyte, the conductive material and the like is made into a paste using an organic solvent to form a positive electrode mixture, the obtained positive electrode mixture is applied to at least one side of the positive electrode current collector 112 and dried, and sintering may be performed to support the positive electrode active material layer 111 on the positive electrode current collector 112.

Examples of organic solvents that can be used in the positive electrode mixture include an amine solvent, an ether solvent, a ketone solvent, an ester solvent, and an amide solvent.

Examples of amine solvents include N,N-dimethylaminopropylamine and diethylenetriamine.

Examples of ether solvents include tetrahydrofuran.

Examples of ketone solvents include methyl ethyl ketone.

Examples of ester solvents include methyl acetate.

Examples of amide solvents include dimethylacetamide and N-methyl-2-pyrrolidone. Hereinafter, N-methyl-2-pyrrolidone may be referred to as NMP.

Examples of methods of applying the positive electrode mixture to the positive electrode current collector 112 include a slit die coating method, a screen coating method, a curtain coating method, a knife coating method, a gravure coating method and an electrostatic spray method.

The positive electrode 110 can be produced by the method described above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the solid electrolyte, the conductive material, and the binder, those described above can be used.

(Negative Electrode Active Material)

As the negative electrode active material contained in the negative electrode active material layer 121, materials that can be doped and de-doped with lithium-ions at a potential lower than that of the positive electrode 110, which are carbon materials, chalcogen compounds (oxides, sulfides, etc.), nitrides, metals or alloys, is an exemplary example.

Examples of carbon materials that can be used as the negative electrode active material include graphites such as natural graphite and artificial graphite, cokes, carbon black, pyrolytic carbons, carbon fibers and calcined organic polymer compound products.

Examples of oxides that can be used as the negative electrode active material include the followings.

Silicon oxide represented by the formula $SiO_x$ (where, x is a positive real number) such as $SiO_2$ and SiO.

Titanium oxide represented by the formula $TiO_x$ (where, x is a positive real number) such as $TiO_2$ and TiO.

Vanadium oxide represented by the formula $VO_x$ (where, x is a positive real number) such as $V_2O_5$ and $VO_2$.

Iron oxide represented by the formula $FeO_x$ (where, x is a positive real number) such as $Fe_3O_4$, $Fe_2O_3$, and FeO.

Tin oxide represented by the formula $SnO_x$ (where, x is a positive real number) such as $SnO_2$ and SnO.

Tungsten oxide represented by the general formula $WO_x$ (where, x is a positive real number) such as $WO_3$ and $WO_2$.

Metal composite oxide containing lithium and titanium or vanadium such as $Li_4Ti_5O_{12}$ and $LiVO_2$.

Examples of sulfides that can be used as the negative electrode active material include the following.

Titanium sulfide represented by the formula $TiS_x$ (where, x is a positive real number) such as $Ti_2S_3$, $TiS_2$, and TiS.

Vanadium sulfide represented by the formula $VS_x$ (where, x is a positive real number) such as $V_3S_4$, $VS_2$, and VS.

Iron sulfide represented by the formula $FeS_x$ (where, x is a positive real number) such as $Fe_3S_4$, $FeS_2$, and FeS.

Molybdenum sulfide represented by the formula $MoS_x$ (where, x is a positive real number) such as $Mo_2S_3$ and $MoS_2$.

Tin sulfide represented by the formula $SnS_x$ (where, x is a positive real number) such as $SnS_2$ and SnS.

Tungsten sulfide represented by the formula $WS_x$ (where, x is a positive real number) such as $WS_2$.

Antimony sulfide represented by the formula $SbS_X$ (where, x is a positive real number) such as $Sb_2S_3$.

Selenium sulfide represented by the formula $SeS_X$ (where, x is a positive real number) such as $Se_5S_3$, $SeS_2$, and SeS.

Examples of nitrides that can be used as the negative electrode active material include lithium-containing nitrides such as $Li_3N$ and $Li_{3-x}A_xN$ (where, A is one or both of Ni and Co, and $0<x<3$).

These carbon materials, oxides, sulfides, and nitrides may be used alone or two or more thereof may be used in combination. In addition, these carbon materials, oxides, sulfides, and nitrides may be crystalline or amorphous.

In addition, examples of metals that can be used as the negative electrode active material include lithium metals, silicon metals and tin metals.

Examples of alloys that can be used as the negative electrode active material include lithium alloys, silicon alloys, tin alloys, and alloys such as $Cu_2Sb$ and $La_3Ni_2Sn_7$.

Examples of lithium alloys include Li—Al, Li—Ni, Li—Si, Li—Sn, and Li—Sn—Ni.

Examples of silicon alloys include Si—Zn.

Examples of tin alloys include Sn—Mn, Sn—Co, Sn—Ni, Sn—Cu, and Sn—La.

For example, these metals and alloys are mainly used as electrodes alone after being processed into a foil shape.

Among the above negative electrode active materials, a carbon material containing graphite such as natural graphite and artificial graphite as a main component is preferably used. This is because the potential of the negative electrode 120 hardly changes from the uncharged state to the fully charged state during charging (the potential flatness is favorable), the average discharging potential is low, and the capacity retention rate when charging and discharging are repeatedly performed is high (cycle characteristics are favorable).

The shape of the carbon material may be, for example, any of a flaky shape such as natural graphite, a spherical shape such as mesocarbon microbeads, a fiber shape such as graphitized carbon fibers and a fine powder aggregate.

In addition, among the above negative electrode active materials, an oxide can be suitably used because it has high thermal stability, and dendrites (dendritic crystals) due to Li metal are unlikely to be generated. As the shape of the oxide, for example, a fiber shape or a fine powder aggregate is preferably used.

(Negative Electrode Current Collector)

As the negative electrode current collector 122 included in the negative electrode 120, a strip-like member made of a metal material such as Cu. Ni, or stainless steel as a forming material is an exemplary example. Among these, preferably. Cu is used as a forming material and processed into a thin film because it is difficult to form an alloy with lithium and it is easy to process.

As a method of supporting the negative electrode active material layer 121 on the negative electrode current collector 122, as in the case of the positive electrode 110, a method of press-molding, a method of applying a paste-like negative electrode mixture containing a negative electrode active material onto the negative electrode current collector 122, performing drying and then pressing and clamping, and a method of applying a paste-like negative electrode mixture containing a negative electrode active material onto the negative electrode current collector 122, performing drying and then sintering is an exemplary example.

(Solid Electrolyte Layer)

The solid electrolyte layer 130 contains the above solid electrolyte (first solid electrolyte). When the positive electrode active material layer 111 contains a solid electrolyte, the solid electrolyte (first solid electrolyte) constituting the solid electrolyte layer 130 and the solid electrolyte (second solid electrolyte) contained in the positive electrode active material layer 111 may be the same substance.

The solid electrolyte layer 130 functions as a medium for transmitting lithium-ions, and also functions as a separator that separates the positive electrode 110 and the negative electrode 120.

The solid electrolyte layer 130 can be formed by depositing an inorganic solid electrolyte on the surface of the positive electrode active material layer 111 included in the above positive electrode 110 by a sputtering method.

In addition, the solid electrolyte layer 130 can be formed by applying a paste-like mixture containing a solid electrolyte to the surface of the positive electrode active material layer 111 included in the above positive electrode 110 and performing drying. After drying, press-mold is performed, additionally pressing is performed by cold isostatic pressing (CIP), and thus the solid electrolyte layer 130 may be formed.

In addition, the solid electrolyte layer 130 can be formed by forming a solid electrolyte in a pellet form in advance, laminating the solid electrolyte pellet and the above positive electrode active material sheet, and performing uniaxial pressing in the lamination direction. The positive electrode active material sheet serves as the positive electrode active material layer 111.

With respect to the obtained laminate of the positive electrode active material layer 111 and the solid electrolyte layer 130, the positive electrode current collector 112 is additionally arranged on the positive electrode active material layer 111. When uniaxial pressing performed in the lamination direction and sintering is additionally performed, the solid electrolyte layer 130 and the positive electrode 110 can be formed.

Such a positive electrode 110 is in contact with the solid electrolyte layer 130. The solid electrolyte layer 130 contains a first solid electrolyte.

The positive electrode 110 has the positive electrode active material layer 111 in contact with the solid electrolyte layer 130 and the positive electrode current collector 112 on which the positive electrode active material layer 111 is laminated. The positive electrode active material layer 111 contains a plurality of particles containing crystals of a lithium metal composite oxide (that is, positive electrode active material which is one aspect of the present invention), and a solid electrolyte (second solid electrolyte) that is filled between the plurality of particles and in contact with the particles.

The solid electrolyte and particles contained in the positive electrode active material layer 111 each are in contact with the solid electrolyte layer 130. That is, the particles contained in the positive electrode active material layer 111 are in contact with the solid electrolyte contained in the positive electrode active material layer 111 and the solid electrolyte layer 130.

Here, it is not necessary for all particles (positive electrode active material) contained in the positive electrode active material layer 111 to be in contact with the solid electrolyte contained in the positive electrode active material layer 111 and the solid electrolyte layer 130.

When the positive electrode active material contained in the positive electrode active material layer 111 comes into contact with the solid electrolyte contained in the positive electrode active material layer 111, it conducts electricity with the solid electrolyte contained in the positive electrode active material layer 111. In addition, when the positive electrode active material contained in the positive electrode active material layer 111 comes into contact with the solid electrolyte layer 130, it conducts electricity with the solid electrolyte layer 130. In addition, when the solid electrolyte contained in the positive electrode active material layer 111 comes into contact with the solid electrolyte layer 130, it conducts electricity with the solid electrolyte layer 130.

Thereby, the positive electrode active material contained in the positive electrode active material layer 111 directly or indirectly conducts electricity with the solid electrolyte layer 130.

The laminate 100 can be produced by laminating the negative electrode 120 on the solid electrolyte layer 130 provided on the positive electrode 110 as described above in a manner in which a negative electrode electrolyte layer 121 is in contact with the surface of the solid electrolyte layer 130 using a known method. Thereby, the solid electrolyte layer 130 comes into contact with the negative electrode active material layer 121 and conducts electricity.

As described above, the obtained all-solid-state lithium-ion battery 1000 in which the solid electrolyte layer 130 is brought into contact with the positive electrode 110 and the negative electrode 120 so that short circuiting is not caused between the positive electrode 110 and the negative electrode 120 is provided. The provided all-solid-state lithium-ion battery 1000 is connected to an external power supply and charged by applying a negative potential to the positive electrode 110 and a positive potential to the negative electrode 120.

In addition, the charged all-solid-state lithium-ion battery 1000 is discharged by connecting a discharge circuit to the positive electrode 110 and the negative electrode 120 and applying a current to the discharge circuit.

According to the positive electrode active material for an all-solid-state lithium-ion battery having the above configuration, it is possible to smoothly exchange lithium-ions with the solid electrolyte in the positive electrode, and it is possible to improve battery performance such as initial charging and discharging efficiency.

According to the electrode having the above configuration, since the above positive electrode active material for an all-solid-state lithium-ion battery is provided, it is possible to improve battery performance such as initial charging and discharging efficiency of the all-solid-state lithium-ion battery.

According to the all-solid-state lithium-ion battery having the above configuration, since the above positive electrode active material for an all-solid-state lithium-ion battery is provided, excellent battery performance such as initial charging and discharging efficiency is exhibited.

While preferable embodiments of the present invention have been described above with reference to the appended drawings, the present invention is not limited to the examples. Various shapes, combinations and the like of constituent members in the above examples are examples, and various modifications can be made based on design requirements and the like without departing from the spirit and scope of the present invention.

As one aspect, the present invention also includes the following embodiments. Hereinafter, a "mixed powder Y" is a mixed powder composed of a positive electrode active material for a lithium-ion battery and a solid electrolyte, and in the mixed powder, the positive electrode active material for a lithium-ion battery is composed of particles containing crystals of a lithium metal composite oxide, the lithium metal composite oxide has a layered structure and contains at least Li and a transition metal, the positive electrode active material for a lithium-ion battery has a particle diameter distribution that satisfies Formula (1), and the solid electrolyte has a particle diameter distribution that satisfies Formula (2).

(2-1) A use of a mixed powder Y for an all-solid-state lithium-ion battery.

(2-2) A use of a mixed powder Y for a positive electrode of an all-solid-state lithium-ion battery.

(2-3) A use of a mixed powder Y for producing an all-solid-state lithium-ion battery.

(2-4) A use of a mixed powder Y for producing a positive electrode of an all-solid-state lithium-ion battery.

(2-A) The use according to any one of (2-1) to (2-4), wherein the all-solid-state lithium-ion battery contains an oxide-based solid electrolyte as a solid electrolyte.

(3-1) A mixed powder Y that is in contact with a solid electrolyte layer.

(3-1-1) The mixed powder Y according to (3-1), wherein the solid electrolyte layer contains an oxide-based solid electrolyte.

(3-2) A positive electrode that is in contact with a solid electrolyte layer, wherein the positive electrode has a positive electrode active material layer in contact with the solid electrolyte layer and a current collector on which the positive electrode active material layer is laminated, wherein the positive electrode active material layer contains a mixed powder Y.

(3-2-1) The positive electrode according to (3-2), wherein the solid electrolyte layer contains an oxide-based solid electrolyte.

(3-5)

An all-solid-state lithium-ion battery including the mixed powder Y according to (3-1) or (3-1-1) or the positive electrode according to (3-2) or (3-2-1).

(4-1)

A method of charging an all-solid-state lithium-ion battery, including providing a solid electrolyte layer in contact with a positive electrode and a negative electrode so that short-circuiting is not caused between the positive electrode and the negative electrode, and applying a negative potential to the positive electrode and a positive potential to the negative electrode by an external power supply, wherein the positive electrode contains a mixed powder Y.

(4-2)

A method of discharging an all-solid-state lithium-ion battery, including providing a solid electrolyte layer in contact with a positive electrode and a negative electrode so that short-circuiting is not caused between the positive electrode and the negative electrode, charging an all-solid-state lithium-ion battery by applying a negative potential to the positive electrode and a positive potential to the negative electrode by an external power supply, and connecting a discharge circuit to the positive electrode and the negative electrode of the charged all-solid-state lithium-ion battery, wherein the positive electrode contains a mixed powder Y.

(4-A) The method of charging an all-solid-state lithium-ion battery according to (4-1) or the method of discharging an all-solid-state lithium-ion battery according to (4-2), wherein the solid electrolyte layer contains an oxide-based solid electrolyte.

EXAMPLES

Hereinafter, the present invention will be described with reference to examples, but the present invention is not limited to these examples.

<Composition Analysis>

Composition analysis of the positive electrode active material obtained by the method to be described below was performed by the method described in the above <Composition analysis>. Here, the composition of the lithium metal composite oxide was a composition in which composition analysis of the positive electrode active material was performed and the obtained analysis result corresponded to Composition Formula (A). That is, the values of x, y, z, and w obtained from the positive electrode active material to be described below were regarded as the values of x, y, z, and w of the lithium metal composite oxide.

<Method of Confirming Layered Structure>

Whether the lithium metal composite oxide contained in the positive electrode active material has a layered structure was confirmed by the above <Method of confirming layered structure>

<Method of Confirming Particle Shape>

The shape of particles contained in the positive electrode active material was confirmed by the method described in the above <Method of confirming particle shape>. When the positive electrode active material contained single particles, the amount thereof was calculated by the above <Method of calculating amount of single particles>.

<Measurement of Particle Diameter Distribution>

The particle diameter distribution of the positive electrode active material and the solid electrolyte is calculated by the following method.

First, a positive electrode active material obtained by a method to be described below or a solid electrolyte 1 to be described below was placed on a conductive sheet attached on the sample stage.

Next, using a scanning electron microscope (JSM-5510 (commercially available from JEOL Ltd.)), an electron beam having an acceleration voltage of 20 kV was emitted to the positive electrode active material or the solid electrolyte 1 to be described below and observation was performed, and subsequent operations were performed according to the method described in the above <Measurement of D10, D50 and D90 in particle diameter distribution of positive electrode active material or solid electrolyte>, and D10, D50, and D90 of the positive electrode active material or the solid electrolyte were obtained.

<Measurement of Press Density>

The press density of the positive electrode active material and the solid electrolyte was measured by the method described in the above <Measurement of press density>.

Example 1

(Production of Positive Electrode Active Material 1)

Water was put into the reaction chamber including a stirrer and an overflow pipe, a sodium hydroxide aqueous solution was then added thereto, and the liquid temperature was maintained at 50° C.

A nickel sulfate aqueous solution, a cobalt sulfate aqueous solution, and a manganese sulfate aqueous solution were mixed at a ratio (atomic ratio) of Ni, Co and Mn of 0.91:0.07:0.02 to prepare a mixed raw material liquid 1.

Next, in the reaction chamber, with stirring, the mixed raw material liquid 1 was continuously added with an ammonium sulfate aqueous solution as a complexing agent, and nitrogen gas was continuously aerated in the reaction chamber. A sodium hydroxide aqueous solution was timely added dropwise so that the pH of the solution in the reaction chamber was a pH of 12.3 so that the temperature of the aqueous solution was 40° C., and thereby nickel cobalt manganese composite hydroxide particles were obtained. The nickel cobalt manganese composite hydroxide particles were washed and then dehydrated in a centrifuge. Then, isolation was performed and drying was performed at 120° C. to obtain a nickel cobalt manganese composite hydroxide 1.

The nickel cobalt manganese composite hydroxide 1, a lithium hydroxide powder and a potassium sulfate powder were weighed out and mixed at a ratio (molar ratio) of Li/(Ni+Co+Mn)=1.26. $K_2SO_4/(LiOH+K_2SO_4)=0.1$, and then calcined under an oxygen atmosphere at 790° C. for 10 hours to obtain a mixture 1 containing a lithium metal composite oxide.

The mixture 1 and pure water (with a water temperature of 5° C.) were mixed so that the proportion of the mixture 1 with respect to the total amount of the mixture 1 and the pure water was 30 mass %, and the obtained slurry was stirred for 10 minutes.

The slurry was dehydrated, and the obtained solid substance was rinsed with pure water (liquid temperature of 5° C.), which was twice the mass of the mixture 1 used to prepare the slurry (rinse process). The solid substance was dehydrated again, vacuum-dried at 80° C. for 15 hours, and then vacuum-dried at 150° C. for 8 hours to obtain a lithium metal composite oxide 1.

The obtained lithium metal composite oxide 1 was sieved with Turbo Screener (commercially available from Freund Turbo Co., Ltd.) under the following operation conditions to obtain a positive electrode active material 1.

(Operation Conditions of Turbo Screener)

Screen used: 45 μm mesh, blade rotation speed: 1,800 rpm, supply speed: 50 kg/hour (Evaluation of Positive Electrode Active Material 1)

When the composition of the positive electrode active material 1 was analyzed and made to correspond to Composition Formula (A), x=0.02, y=0.07, z=0.02, w=0.

As a result of SEM observation of the positive electrode active material 1, single particles were contained (amount of 90% or more). The crystal structure of the lithium metal composite oxide 1 contained in the positive electrode active material 1 was a hexagonal layered crystal structure belonging to the space group R-3m.

(D90–D10)/D50 of the positive electrode active material 1 was 1.33.

The press density of the positive electrode active material 1 was 3.02 g/cm$^3$.

Example 2

(Production of Positive Electrode Active Material 2)

Water was put into the reaction chamber including a stirrer and an overflow pipe, a sodium hydroxide aqueous solution was then added thereto, and the liquid temperature was maintained at 50° C.

A nickel sulfate aqueous solution, a cobalt sulfate aqueous solution, and a manganese sulfate aqueous solution were mixed at a ratio (atomic ratio) of Ni, Co and Mn of 0.50:0.20:0.30 to prepare a mixed raw material liquid 2.

Next, in the reaction chamber, with stirring, the mixed raw material liquid 2 was continuously added with an ammonium sulfate aqueous solution as a complexing agent, and nitrogen gas was continuously aerated in the reaction chamber. A sodium hydroxide aqueous solution was timely added dropwise so that the pH of the solution in the reaction chamber was a pH of 11.1 when the temperature of the aqueous solution was 40° C., and nickel cobalt manganese composite hydroxide particles were obtained. The nickel cobalt manganese composite hydroxide particles were washed and then dehydrated in a centrifuge. Then, isolation was performed and drying was performed at 120° C. to obtain a nickel cobalt manganese composite hydroxide 2.

The nickel cobalt manganese composite hydroxide particles 2 and a lithium hydroxide powder were weighed out and mixed at a ratio (molar ratio) of Li/(Ni+Co+Mn)=1.05, and then calcined under an air atmosphere at 970° C. for 4 hours to obtain a positive electrode active material 2.
(Evaluation of Positive Electrode Active Material 2)

When the composition of the positive electrode active material 2 was analyzed and made to correspond to Composition Formula (A), x=0.05, y=0.20, z=0.30, w=0. The composition ratio of the positive electrode active material was the same as the preparation ratio of Ni:Co:Mn=0.50: 0.20:0.30, as in the result of the positive electrode active material 1. This also applies to the positive electrode active material 2, and the ratio was the same as the preparation ratio of Ni:Co:Mn=0.50:0.20:0.30. Therefore, theoretically, the composition of the positive electrode active material 2 was x=0.05, y=420, z=0.30, w=.

As a result of SEM observation of the positive electrode active material 2, primary particles and secondary particles were contained, and single particles were not contained. The crystal structure of the positive electrode active material 2 was a hexagonal layered crystal structure belonging to the space group R-3m.

(D90–D10)/D50 of the positive electrode active material 2 was 1.16.

The press density of the positive electrode active material 2 was 2.97 g/cm$^3$.

Example 3

(Production of Positive Electrode Active Material E1)

A commercial product LiCoO$_2$ was evaluated as the positive electrode active material E1. As the positive electrode active material E1, a commercial product LiCoO$_2$ having a particle diameter distribution within a range of $D_{50}$=5 μm±2 μm was used.
(Evaluation of Positive Electrode Active Material E1)

As a result of SEM observation of the positive electrode active material E1, single particles were contained (content: 100%).

When the particle diameter distribution of the positive electrode active material E1 was measured, (D90–D10)/D50 was 1.56. The press density of the positive electrode active material E1 was 2.64 g/cm$^3$.

Example 4

(Production of Positive Electrode Active Material E2) A nickel cobalt manganese composite hydroxide 4 was obtained in the same manner as in Example 1 except that a nickel sulfate aqueous solution, a cobalt sulfate aqueous solution, and a manganese sulfate aqueous solution were mixed at a ratio (atomic ratio) of Ni, Co and Mn of 0.91:0.07:0.02 to prepare a mixed raw material liquid and a sodium hydroxide aqueous solution was timely added dropwise so that the pH of the solution in the reaction chamber was a pH of 12.3 when the temperature of the aqueous solution was 40° C.

The nickel cobalt manganese composite hydroxide 4 and a lithium hydroxide powder were weighed out and mixed at a ratio (molar ratio) of Li/(Ni+Co+Mn)=1.26 and then calcined under an oxygen atmosphere at 760° C. for 6 hours to obtain a positive electrode active material E2.
(Evaluation of Positive Electrode Active Material E2)

When the composition of the positive electrode active material E2 was analyzed and made to correspond to Composition Formula (A), x=0.02, y=0.07, z=0.02, w=0.

As a result of SEM observation of the positive electrode active material E2, single particles were contained (content: 90% or more).

When the particle diameter distribution of the positive electrode active material E2 was measured, (D90–D10)/D50 was 1.82.

The press density of the positive electrode active material E2 was 2.86 g/cm$^3$.
<Production of Mixed Powder for all-Solid-State Lithium-Ion Battery>

The positive electrode active materials of Example 1 to Example 4 and the solid electrolyte were mixed at a volume ratio shown in the following Table 1 to obtain mixed powders for an all-solid-state lithium-ion battery of Examples 1 and 2 and Comparative Examples 1 and 2.

TABLE 1

|  | Positive electrode active material | | Solid electrolyte | | | |
| --- | --- | --- | --- | --- | --- | --- |
|  | Product used | (D90-D10)/ D50 | Product used | (D90-D10)/ D50 | Volume ratio | D50 ratio |
| Example 1 | Example 1 | 1.33 | Solid electrolyte 1 | 1.10 | 60:40 | 1.38 |

TABLE 1-continued

| | Positive electrode active material | | Solid electrolyte | | | |
|---|---|---|---|---|---|---|
| | Product used | (D90-D10)/D50 | Product used | (D90-D10)/D50 | Volume ratio | D50 ratio |
| Example 2 | Example 2 | 1.16 | Solid electrolyte 1 | 1.10 | 61:39 | 3.61 |
| Comparative Example 1 | Example 3 | 1.56 | Solid electrolyte 1 | 1.10 | 64:36 | 2.26 |
| Comparative Example 2 | Example 4 | 1.82 | Solid electrolyte 1 | 1.10 | 62:38 | 2.56 |

In Table 1, the "solid electrolyte 1" is a solid electrolyte represented by the composition formula $Li_3BO_3$ and having a melting point of 700° C., a D10 of 1.73 μm, a D50 of 3.01 μm, a D90 of 5.03 μm, a (D90–D10)/D50 of 1.10, and a press density of 1.15 g/cm³.

In Table 1, the "volume ratio" is (volume of positive electrode active material):(volume of solid electrolyte). The volume ratio was calculated from (mass of positive electrode active material/press density of positive electrode active material):(mass of solid electrolyte/press density of solid electrolyte). The "D50 ratio" is a ratio of D50 of the positive electrode active material for a lithium-ion battery to D50 of the solid electrolyte 1 ((positive electrode active material powder D50)/(solid electrolyte D50)).

<Production of all-Solid-State Lithium-Ion Battery>

All-solid-state lithium-ion batteries were produced using the mixed powders for an all-solid-state lithium-ion battery of Examples 1 and 2 and Comparative Examples 1 and 2 by the method described in the above <Production of all-solid-state lithium-ion battery>.

<Charging and Discharging Test>

Using the all-solid-state lithium-ion battery produced by the above method, the charging and discharging test was performed by the method described in the above <Calculation of initial charging and discharging efficiency>, and the initial charging and discharging efficiency was calculated.

<Production of Liquid-Based Lithium Secondary Battery>
(Production of Positive Electrode for Lithium Secondary Battery)

The positive electrode active material of Examples 1 to 4, a conductive material (acetylene black), and a binder (PVdF) were added so that the composition had a ratio of positive electrode active material:conductive material:binder=92:5:3 (mass ratio), and kneaded to prepare a paste-like positive electrode mixture. When the positive electrode mixture was prepared. NMP was used as an organic solvent.

The obtained positive electrode mixture was applied to an Al foil with a thickness of 40 μm as a current collector and vacuum-dried at 150° C. for 8 hours to obtain a positive electrode for a lithium secondary battery. The electrode area of the positive electrode for a lithium secondary battery was 1.65 cm².

(Production of Lithium Secondary Battery (Coin Type Half Cell))

The following operation was performed in an argon atmosphere glove box.

The positive electrode for a lithium secondary battery produced in (Production of positive electrode for lithium secondary battery) was placed on a lower lid of parts for a coin type battery R2032 (commercially available from Hohsen Corporation) with an aluminum foil surface facing downward, and a separator (polyethylene porous film) was placed thereon.

300 μl of an electrolytic solution was injected therein. As the electrolytic solution, a solution obtained by dissolving $LiPF_6$ at a ratio of 1.0 mol/l in a mixed solution containing ethylene carbonate, dimethyl carbonate and ethyl methyl carbonate at 30:35:35 (volume ratio) was used.

Next, using metal lithium as a negative electrode, the negative electrode was placed on the upper side of a laminate film separator, an upper lid was covered with a gasket, and caulking was performed with a caulking machine to produce a lithium secondary battery (coin type half cell R2032; hereinafter may be referred to as a "half cell").

<Charging and Discharging Test>

Using the half cell produced by the above method, the charging and discharging test was performed under the following conditions, and the initial charging and discharging efficiency was calculated.

(Charging and Discharging Conditions)

A test temperature of 25° C.

A maximum charging voltage of 4.3 V and a charging current density of 0.2C

A minimum discharging voltage of 2.5 V, a discharging current density of 0.2C, and a cutoff of 0.05C (Calculation of Initial Charging and Discharging Efficiency)

The initial charging and discharging efficiency was obtained based on the following calculation formula from the charging capacity and the discharging capacity when charging and discharging were performed under the above conditions.

Initial charging and discharging efficiency (%)=initial discharging capacity (mAh/g)/initial charging capacity (mAh/g)×100

Table 2 shows the results of the initial charging and discharging efficiency.

TABLE 2

| | Initial charging and discharging efficiency (%) | |
|---|---|---|
| | Liquid LIB | All-solid-state |
| Example 1 | 83.51 | 83.25 |
| Example 2 | 87.11 | 86.89 |
| Comparative Example 1 | 98.65 | 32.49 |
| Comparative Example 2 | 87.44 | 30.97 |

In the evaluation results, when the mixed powder of Examples 1 and 2 was used, the initial charging and discharging efficiency was high in both the case of the liquid-based lithium-ion secondary battery and the case of the all-solid-state lithium-ion battery.

On the other hand, when the mixed powder of Comparative Examples 1 and 2 was used, the initial charging and discharging efficiency was high in the case of the liquid-based lithium-ion secondary battery, and the initial charging and discharging efficiency was greatly reduced in the case of the all-solid-state lithium-ion battery.

Accordingly, it has been found that, even if positive electrode active materials all favorably operated in liquid-based lithium-ion secondary batteries, but if they were used in all-solid-state lithium-ion batteries, a large difference occurred in the battery performance, and the positive electrode active material for an all-solid-state lithium-ion battery according to the present invention exhibited high initial charging and discharging efficiency and favorable battery performance.

As described above, it has been found that the present invention is beneficial.

<Reference Test: Analysis of Mixed Powder>

The mixed powder of Example 1 was analyzed by the method described in the above <Analysis method of mixed powder>.

As a result, (D90−D10)/D50 of the positive electrode active material contained in the mixed powder of Example 1 was 1.33.

In addition, (D90−D10)/D50 of the solid electrolyte contained in the mixed powder of Example 1 was 1.01.

In addition, the volume ratio of the positive electrode active material and the solid electrolyte of the mixed powder of Example 1 was 60:40.

REFERENCE SIGNS LIST

100 Laminate
110 Positive electrode
111 Positive electrode active material layer
112 Positive electrode current collector
113 External terminal
120 Negative electrode
121 Negative electrode electrolyte layer
122 Negative electrode current collector
123 External terminal
130 Solid electrolyte layer
200 Exterior body
200a Opening
1000 All-solid-state lithium-ion battery

What is claimed is:

1. A mixed powder for an all-solid-state lithium-ion battery comprising a positive electrode active material for a lithium-ion battery and a solid electrolyte,
wherein the positive electrode active material comprises particles containing crystals of a lithium metal composite oxide, and the lithium metal composite oxide has a layered structure and contains at least Li and a transition metal,
wherein the solid electrolyte is an oxide-based solid electrolyte, and the oxide-based solid electrolyte is a Li—B—O compound,
wherein the positive electrode active material has a particle diameter distribution that satisfies the following Formula (1), and
wherein the solid electrolyte has a particle diameter distribution that satisfies the following Formula (2):

$(D90-D10)/D50 \leq 1.5$ (1)

$(D90-D10)/D50 \leq 2.0$ (2).

2. The mixed powder for an all-solid-state lithium-ion battery according to claim 1,
wherein a volume ratio between the positive electrode active material for a lithium-ion battery and the solid electrolyte is 50:50 to 95:5, and
wherein a ratio between D50 of the positive electrode active material for a lithium-ion battery and D50 of the solid electrolyte ((D50 of positive electrode active material for a lithium-ion battery)/(D50 of solid electrolyte)) is 0.1 or more and 10 or less.

3. The mixed powder for an all-solid-state lithium-ion battery according to claim 1,
wherein the solid electrolyte has a D50 of 10 μm or less and a D90 of 15 μm or less.

4. The mixed powder for an all-solid-state lithium-ion battery according to claim 1,
wherein the solid electrolyte has a melting point of 900° C. or lower.

5. The mixed powder for an all-solid-state lithium-ion battery according to claim 1,
wherein the transition metal is at least one element selected from the group consisting of Ni, Co, Mn, Ti, Fe, V and W.

6. The mixed powder for an all-solid-state lithium-ion battery according to claim 5,
wherein the lithium metal composite oxide is represented by the following Formula (A):

$$Li[Li_x(Ni_{(1-y-z-w)}Co_yMn_zM_w)_{1-x}]O_2 \quad (A)$$

where, M is at least one element selected from the group consisting of Fe, Cu, Ti, Mg, Al, W, B, Mo, Nb, Zn, Sn, Zr, Ga and V, and $-0.10 \leq x \leq 0.30$, $0 \leq y \leq 0.40$, $0 \leq z \leq 0.40$, $0 \leq w \leq 0.10$, and $0 < y+z+w$ are satisfied.

7. The mixed powder for an all-solid-state lithium-ion battery according to claim 6,
wherein, in Formula (A), $1-y-z-w \geq 0.50$ and $y \leq 0.30$ are satisfied.

8. The mixed powder for an all-solid-state lithium-ion battery according to claim 1,
wherein the positive electrode active material particles are composed of primary particles, secondary particles which are aggregates of the primary particles, and single particles that exist independently of the primary particles and the secondary particles, and
wherein the amount of the single particles in the positive electrode active material particles is 20% or more.

9. A mixed paste for an all-solid-state lithium-ion battery comprising the mixed powder according to claim 1 and an organic binder at a mass ratio of 10:90 to 90:10.

10. An electrode comprising the mixed powder for an all-solid-state lithium-ion battery according to claim 1.

11. An electrode comprising the mixed paste for an all-solid-state lithium-ion battery according to claim 9.

12. The electrode according to claim 10, further comprising another solid electrolyte.

13. An all-solid-state lithium-ion battery comprising a positive electrode, a negative electrode, and a solid electrolyte layer interposed between the positive electrode and the negative electrode,
wherein the solid electrolyte layer contains a first solid electrolyte,
wherein the positive electrode has a positive electrode active material layer in contact with the solid electrolyte layer and a current collector on which the positive electrode active material layer is laminated, and
wherein the positive electrode active material layer contains the mixed powder for an all-solid-state lithium-ion battery according to claim 1.

14. The all-solid-state lithium-ion battery according to claim 13, wherein the positive electrode active material layer contains the mixed powder for an all-solid-state lithium-ion battery and a second solid electrolyte.

15. The all-solid-state lithium-ion battery according to claim 14,
wherein the first solid electrolyte and the second solid electrolyte are the same substance.

16. The all-solid-state lithium-ion battery according to claim 13,
wherein the first solid electrolyte has an amorphous structure.

17. The all-solid-state lithium-ion battery according to claim 13,
wherein the first solid electrolyte is an oxide-based solid electrolyte.

18. The electrode according to claim 11, further comprising another solid electrolyte.

19. The all-solid-state lithium-ion battery according to claim 14,
wherein the first solid electrolyte has an amorphous structure.

20. The all-solid-state lithium-ion battery according to claim 14,
wherein the first solid electrolyte is an oxide-based solid electrolyte.

21. The mixed powder for an all-solid-state lithium-ion battery according to claim 1,
wherein the Li—B—O compound includes $Li_3BO_3$, $Li_2B_4O_7$, and $LiBO_2$.

* * * * *